(12) United States Patent
Sekiguchi

(10) Patent No.: US 7,192,503 B2
(45) Date of Patent: Mar. 20, 2007

(54) METHOD OF MANUFACTURING ELECTRO-OPTICAL DEVICE, METHOD OF DIVIDING A PLURALITY OF SUBSTRATES, ELECTRO-OPTICAL DEVICE SUBSTRATE, AND ELECTRO-OPTICAL DEVICE

(75) Inventor: Yuji Sekiguchi, Chitose (JP)

(73) Assignee: Seiko Epson Corporation, Tokyo (JP)

( * ) Notice: Subject to any disclaimer, the term of this patent is extended or adjusted under 35 U.S.C. 154(b) by 61 days.

(21) Appl. No.: 10/920,159

(22) Filed: Aug. 18, 2004

(65) Prior Publication Data

US 2005/0077638 A1 Apr. 14, 2005

(30) Foreign Application Priority Data

Aug. 21, 2003 (JP) .............................. 2003-297658
Sep. 4, 2003 (JP) .............................. 2003-312757
Jun. 15, 2004 (JP) .............................. 2004-176919

(51) Int. Cl.
 G02F 1/1333 (2006.01)
 G02F 1/13 (2006.01)
 B32B 37/00 (2006.01)

(52) U.S. Cl. ...................... 156/257; 156/268; 156/101; 29/592.1; 83/875; 83/852; 83/880; 225/2; 225/96.5

(58) Field of Classification Search ................ 156/101, 156/257, 258, 268; 225/2, 96.5; 29/592.1; 349/200; 83/861, 862, 875, 880

See application file for complete search history.

(56) References Cited

U.S. PATENT DOCUMENTS 4,275,494 A * 6/1981 Kohyama et al. .......... 29/592.1

FOREIGN PATENT DOCUMENTS

JP A 2001-147423 5/2001
KR A-2003-0036944 5/2003

* cited by examiner

*Primary Examiner*—Linda Gray
(74) *Attorney, Agent, or Firm*—Oliff & Berridge, PLC

(57) ABSTRACT

To realize a method of manufacturing an electro-optical device, which is capable of completely dividing a plurality of substrates used for the electro-optical device along division lines, in a method of manufacturing the electro-optical device, two or more substrates used for electro-optical devices, which are adhered to each other, are divided along division lines. The method includes adhering, a first substrate and a second substrate, on whose one surface a plurality of grooves or a groove is formed in a predetermined width along a division line, to each other on the surface of the second substrate where the plurality of grooves or the one groove is formed and dividing generated cracks in the other surface of the first substrate, which is opposite to the surface adhered to the second substrate, along the division line to divide the first substrate and the second substrate that are adhered to each other. To realize a method of manufacturing an electro-optical device, which is capable of completely dividing a plurality of substrates used for the electro-optical device along division lines.

13 Claims, 16 Drawing Sheets

F I G. 3
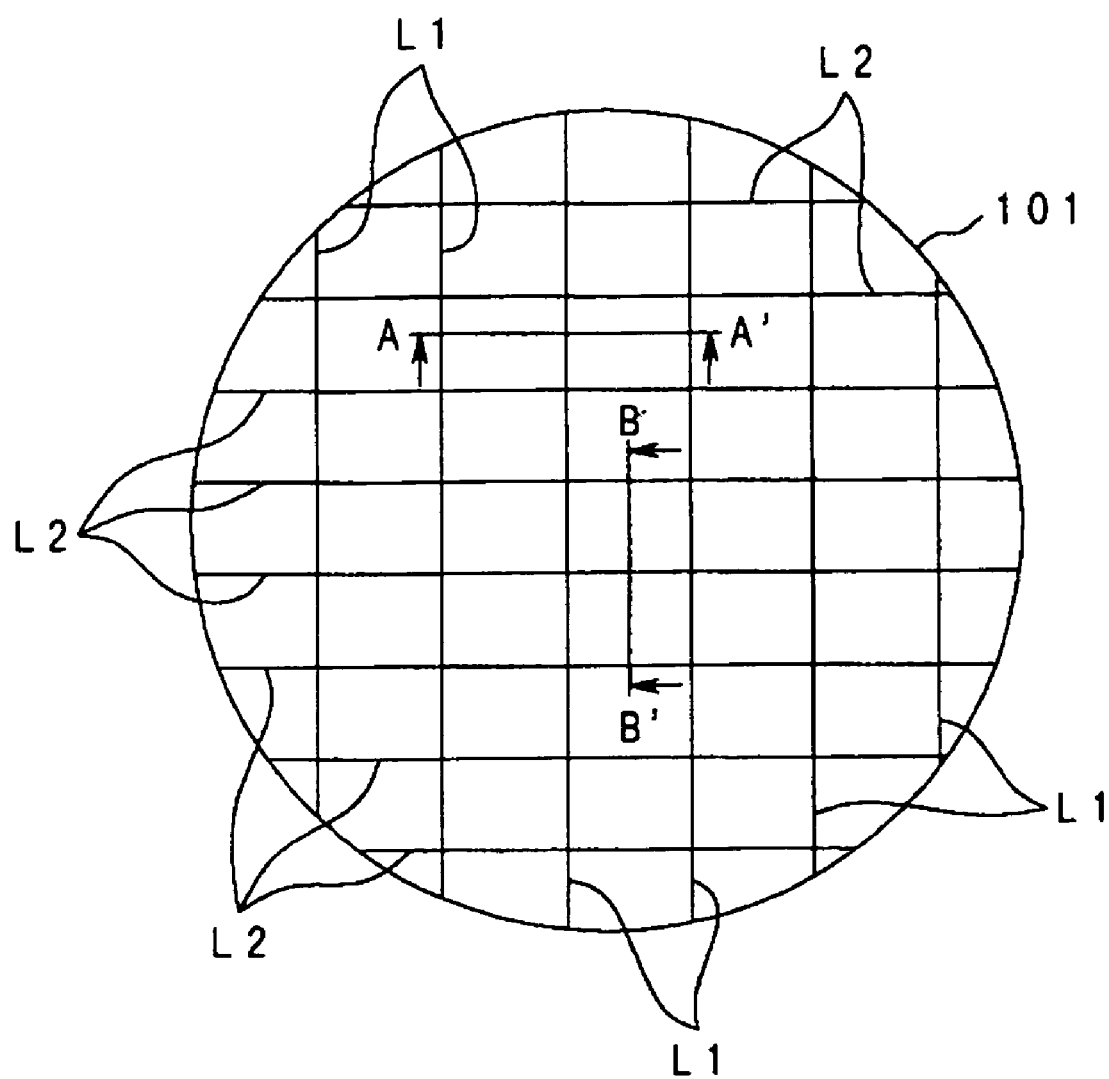

F I G. 1 7
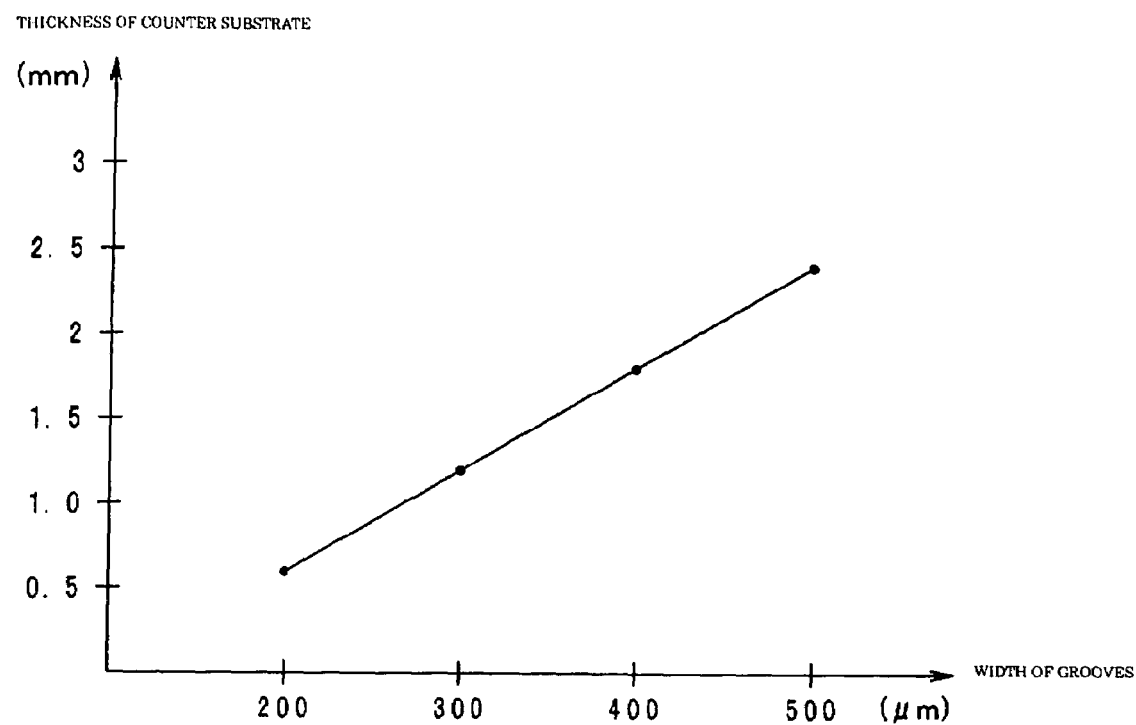

METHOD OF MANUFACTURING ELECTRO-OPTICAL DEVICE, METHOD OF DIVIDING A PLURALITY OF SUBSTRATES, ELECTRO-OPTICAL DEVICE SUBSTRATE, AND ELECTRO-OPTICAL DEVICE

BACKGROUND OF THE INVENTION

1. Field of Invention

Exemplary aspects of the present invention relate to a method of manufacturing an electro-optical device, a method of dividing a plurality of substrates, an electro-optical device substrate, and an electro-optical device, in particular, to a method of manufacturing an electro-optical device by dividing a plurality of substrates connected to each other along division lines, an electro-optical device substrate, and an electro-optical device.

2. Description of Related Art

Related art electro-optical devices including liquid crystal display devices are typically used for projection type projector devices as well as display monitor devices. In particular, in the projection type projector devices, in order to increase a degree of precision and to display images on a large screen, thin film transistor (TFT) driving-type liquid crystal display devices are widely used.

According to the TFT driving-type liquid crystal display device, a light shielding layer shields the TFTs and signal wiring lines from light. The light-shielding layer is in stripes or in a matrix. The latter is referred to as black matrices. Furthermore, in order to display images at a high degree of precision, when the size of the liquid crystal display device is maintained and the number of pixels increases, the aperture ratio is reduced. Thus, in order to enhance optical use efficiency, a micro lens is used. This is to enhance the light use efficiency by focusing the light including light in a black matrix region by the micro lens.

In order to enhance productivity, a large TFT substrate, on which a plurality of TFT elements are formed, and a large lens substrate are adhered to each other with large cover glass interposed. Then, the plurality of substrates connected to each other are divided into individual liquid crystal display devices to simultaneously manufacture a plurality of liquid crystal display devices. This manufacturing method has high productivity and when the three large connected substrates are divided, a technology of increasing the degree of precision of division is provided. According to such a related art technology, one wide groove is formed on the cover glass and the interposed cover glass is divided at a high degree of precision using the groove. In particular, there exists a related art method of polishing the cover glass from the surface opposite to the surface, on which the groove is formed, to the depth of the groove, to previously divide the cover glass, such that the plurality of substrates connected to each other are divided into individual liquid crystal display devices. There is also a related art method of polishing the cover glass from the surface opposite to the surface, on which the groove is formed to the depth that does not reach the groove, such that the plurality of substrates connected to each other, including the micro lens substrate, are divided into individual liquid crystal display devices by stress applied to the cover glass. See Japanese Unexamined Patent Application Publication No. 2001-147423.

SUMMARY OF THE INVENTION

However, in a method of polishing cover glass from the surface opposite to the surface, on which one wide groove is formed to the depth that does not reach the groove, such that a plurality of substrates connected to each other are divided by stress applied to the cover glass, although the three large substrates are divided by a scribing and breaking method, it is revealed by experiments of the present applicant that the cover glass in the center may not be divided in a predetermined position. This may cause an inferior product or the cover glass may not be completely divided to cause division inferiority. When the division inferiority is caused, the cover glass must be divided by hand which causes an increase in manufacturing costs.

This is because, although a crack is generated in one surface by forming a groove, such as scribing or dicing, since the direction in which the crack proceeds is not determined, a crack may not be generated in the groove provided in the other substrate. Thus, according to the above-described method, it is not possible for the crack, generated in the groove provided in one substrate of a plurality of substrates connected to each other, to allow cracks to be correctly generated in the other substrates in desired positions.

Accordingly, an exemplary aspect of the present invention provides a method of manufacturing an electro-optical device capable of correctly dividing a plurality of substrates used for the electro-optical device, which are connected to each other, along division lines.

An exemplary aspect of the present invention provides a method of manufacturing an electro-optical device by dividing two or more substrates used for electro-optical devices, which are adhered to each other, along division lines. The method includes adhering a first substrate to a second substrate on a surface of the second substrate, forming a plurality of grooves or a wide groove along the division lines in a predetermined width on the surface of the second substrate, and dividing the first substrate and the second substrate, by generating cracks in another surface of the first substrate which is opposite to a surface of the first substrate adhered to the second substrate, along the division lines.

According to such a structure, it is possible to completely divide the two substrates, which are used for electro-optical devices, along the division lines.

Also, according to a method of manufacturing an electro-optical device of an exemplary aspect of the present invention, when the first substrate is divided by generating the cracks along the division lines, the predetermined width may be defined by the positions of cracks that reach a surface of the first substrate facing the second substrate.

According to such a structure, the cracks generated in the first substrate can reach the plurality of grooves or the one wide groove of the second substrate.

Also, according to a method of manufacturing an electro-optical device of an exemplary aspect of the present invention, the first substrate may be a lens substrate, on which a micro lens array is formed, and the second substrate may be cover glass, on which a light shielding layer is formed.

According to such a structure, it is possible to completely divide the two substrates which include the lens substrate and the cover glass, which are adhered to each other, along the division lines.

According to a method of manufacturing an electro-optical device of an exemplary aspect of the present invention, the first substrate may be a dustproof substrate and the second substrate may be a counter substrate.

According to such a structure, it is possible to completely divide the two substrates which include the counter substrate and the dustproof substrate, which are adhered to each other, along the division lines.

Further, according to a method of manufacturing an electro-optical device of an exemplary aspect of the present invention, the first substrate may be a dustproof substrate, and the second substrate may be a TFT substrate. According to such a structure, it is possible to completely divide the two substrates where the dustproof substrate is adhered to the TFT substrate, along the division lines.

An exemplary aspect of the present invention provides a method of manufacturing an electro-optical device by dividing three or more substrates, which are adhered to each other, along division lines. The method includes a first adhering of adhering a first substrate to a second substrate on a surface of the second substrate, forming a plurality of grooves or a wide groove along the division lines in a predetermined width on the surface of the second substrate, a second adhering of adhering the first substrate and the second substrate adhered in the first adhering and a third substrate to each other on another surface of the second substrate, which is opposite to the surface of the second substrate where the plurality of grooves or the one wide groove is formed, and dividing the first to third substrates by generating cracks in the respective surfaces of the first substrate and the third substrate opposite to surfaces which face the second substrate, along the division lines.

According to such a structure, it is possible to completely divide the three substrates used for electro-optical devices, which are adhered to each other, along the division lines.

According to a method of manufacturing an electro-optical device of an exemplary aspect of the present invention, the first substrate may be a lens substrate, on which a micro lens array is formed. The second substrate may be cover glass polished to a predetermined thickness after the first adhering to form a light-shielding layer thereon. The third substrate may be a TFT substrate.

According to such a structure, it is possible to completely divide the three substrates including the lens substrate and the TFT substrate, to which the cover glass is adhered, along the division lines.

According to a method of manufacturing an electro-optical device of an exemplary aspect of the present invention, in the dividing after dividing the third substrate by generating cracks in the third substrate, the first substrate is may be divided by generating cracks in the first substrate.

According to such a structure, even if the TFT substrate is bent, it is possible to completely divide the three substrates along the division lines.

An exemplary aspect of the present invention provides a method of manufacturing an electro-optical device by dividing at least a plurality of substrates adhered to each other along division lines. The method includes preparing a first substrate and a second substrate, each having a plurality of grooves or a wide groove formed along the division lines in a predetermined width, a first adhering of adhering the first substrate and the second substrate to each other by adhering another surface of the first substrate opposite to the surface of the first substrate where the plurality of grooves or the one wide groove is formed, and the surface of the second substrate on which the plurality of grooves or the one wide groove is formed, a second adhering of adhering the first substrate and the third substrate to each other on the surface of the first substrate on which the plurality of grooves or the one wide groove is formed, a third adhering of adhering the second substrate and a fourth substrate to each other on the surface of the second substrate opposite to the surface of the second substrate on which the plurality of grooves or the one wide groove is formed, and of dividing the first to fourth substrates by generating cracks in surfaces of the third substrate and the fourth substrate opposite to surfaces which face the first substrate and the second substrate, respectively, along the division lines.

According to such a structure, it is possible to completely divide the four substrates used for electro-optical devices, which are adhered to each other, along the division lines.

According to a method of manufacturing an electro-optical device of an exemplary aspect of the present invention, when the cracks are generated along the division lines to divide the third substrate, the predetermined width may be defined by the positions of cracks that reach a surface of the third surface facing the first substrate.

According to such a structure, it is possible to completely divide the four substrates including the first substrate adhered to the third substrate and the second substrate adhered to the fourth substrate along the division lines.

According to a method of manufacturing an electro-optical device of an exemplary aspect of the present invention, the first substrate may be a lens substrate, on which a micro lens array is formed, and the second substrate may be cover glass polished to a predetermined thickness after the first adhering to form a light-shielding layer thereon. The third substrate may be a dustproof substrate and the fourth substrate may be a TFT substrate.

According to such a structure, it is possible to completely divide the four substrates including the cover glass and the dustproof substrate along the division lines.

An exemplary aspect of the present invention provides a method of manufacturing an electro-optical device by dividing at least a plurality of substrates adhered to each other along division lines. The method includes preparing a first substrate and a second substrate, each having a plurality of grooves or a wide groove formed along the division lines in a predetermined width, a first adhering of adhering the first substrate and a third substrate to each other on a surface of the first substrate where the plurality of grooves or the one wide groove is formed, a second adhering of adhering the second substrate and a fourth substrate to each other on a surface of the second substrate where the plurality of grooves or the one wide groove is formed, a third adhering of adhering the first substrate and the second substrate to each other by adhering another surface of the first substrate, which is opposite to the surface of the first substrate where the plurality of grooves or the one wide groove is formed, and the surface of the second substrate, which is opposite to the surface of the second substrate where the plurality of grooves or the one wide groove is formed, and dividing the first to fourth substrates by generating cracks in surfaces of the third substrate and the fourth substrate opposite to surfaces which face the first substrate and the second substrate, respectively, along the division lines.

According to such a structure, it is possible to completely divide the four substrates used for electro-optical devices along the division lines.

According to a method of manufacturing an electro-optical device of an exemplary aspect of the present invention, when the third substrate and the fourth substrate are divided by generating cracks along the division lines, the predetermined width may be defined by the positions of cracks that reach a surface of the third substrate facing the first substrate and the positions of cracks that reach a surface the fourth substrate facing the second substrate.

According to such a structure, it is possible to completely divide the four substrates including the first substrate adhered to the third substrate and the second substrate adhered to the fourth substrate along the division lines.

According to a method of manufacturing an electro-optical device of an exemplary embodiment of the present invention, the first substrate may be cover glass polished to a predetermined thickness after the first adhering to form a light-shielding layer thereon. The second substrate may be a TFT substrate. The third substrate may be a lens substrate, on which a micro lens array is formed. The fourth substrate may be a dustproof substrate.

According to such a structure, it is possible to completely divide the four substrates including the micro lens substrate and the dustproof substrate along the division lines.

An exemplary aspect of the present invention provides a method of manufacturing an electro-optical device by dividing at least a plurality of substrates adhered to each other along division lines. The method includes preparing a first substrate, a second substrate, and a third substrate, each having a plurality of grooves or a wide groove formed along the division lines in a predetermined width, a first adhering of adhering the first substrate and the second substrate to each other by adhering the surface of the first substrate where the plurality of grooves or the one wide groove is formed and the surface of the second substrate, which is opposite to the surface of the second substrate where the plurality of grooves or the one wide groove is formed, a second adhering of adhering the second substrate and a fourth substrate to each other on the surface of the second substrate where the plurality of grooves or the one wide groove is formed, a third adhering of adhering the third substrate and a fifth substrate on the surface of the third substrate where the plurality of grooves or the one wide groove is formed, a fourth adhering adhering the first substrate and the third substrate by adhering a surface of the first substrate, which is opposite to the surface of the first substrate where the plurality of grooves or the one wide groove is formed and a surface of the third substrate, which is opposite to the surface of the third substrate where the plurality of grooves or the one wide groove is formed, and dividing the first to fifth substrates by generating cracks in surfaces of the fourth substrate and the fifth substrate opposite to surfaces of the fourth substrate and the fifth substrate which face the second substrate and the third substrate, respectively, along the division lines.

According to such a structure, it is possible to completely divide the five substrates used for electro-optical devices along the division lines.

According to a method of manufacturing an electro-optical device of an exemplary aspect of the present invention, when the fourth substrate and the fifth substrate are divided by generating cracks along the division lines, the predetermined width may be defined by the positions of cracks that reach a surface of the fourth substrate facing the second substrate and a surface of the fifth substrate facing the third substrate.

According to such a structure, it is possible to completely divide the five substrates including the second substrate adhered to the fourth substrate and the third substrate adhered to the fifth substrate along the division lines.

According to a method of manufacturing an electro-optical device of an exemplary aspect of the present invention, the first substrate may be cover glass polished to a predetermined thickness after the first adhering to form a light-shielding layer thereon. The second substrate may be a lens substrate, on which a micro lens array is formed. The third substrate may be a TFT substrate. The fourth and fifth substrates may be dustproof substrates.

According to such a structure, it is possible to completely divide the five substrates including the micro lens substrate and the two dustproof-substrates along the division lines.

A substrate for an electro-optical device according to an exemplary aspect of the present invention is manufactured by the method of manufacturing an electro-optical device according to an exemplary aspect of the present invention.

An exemplary aspect of the present invention provides a method of dividing a plurality of substrates, by which two substrates adhered to each other are divided along division lines. The method includes forming a plurality of grooves or a wide groove on one surface of a first substrate along the division lines in a predetermined width, adhering the first substrate and a second substrate to each other on the surface of the first substrate where the plurality of grooves or the one wide groove is formed, and dividing the first substrate and the second substrate by generating cracks on the other surface of the second substrate, which is opposite to the surface of the second substrate adhered to the first substrate, along the division lines. The predetermined width is at least approximately 8% of the thickness of the second substrate.

According to such a structure, it is possible to make the product yield no less than 50% when the plurality of substrates are divided into individual products.

According to the method of dividing a plurality of substrates of an exemplary aspect of the present invention, the predetermined width may be at least approximately 17% of the thickness of the second substrate.

According to such a structure, it is possible to make the product yield no less than 80% when the plurality of substrates are divided into individual products.

According to a method of dividing a plurality of substrates of an exemplary aspect of the present invention, the predetermined width may be at least approximately 25% of the thickness of the second substrate.

According to such a structure, it is possible to make the product yield no less than 98% when the plurality of substrates adhered to each other are divided into individual products.

According to a method of dividing a plurality of substrates of an exemplary aspect of the present invention, the predetermined width may be at least approximately 33% of the thickness of the second substrate.

According to such a structure, it is possible to make product yield 100% when the plurality of substrates connected to each other are divided into individual products.

According to a method of dividing a plurality of substrates of an exemplary aspect of the present invention, the first and second substrates may be used for electro-optical devices.

According to such a structure, it is possible to completely divide the plurality of substrates used for electro-optical devices along the division lines.

According to a method of dividing a plurality of substrates of an exemplary aspect of the present invention, the electro-optical device is a liquid crystal display device and each of the first and second substrates may be any one of an element substrate, a counter substrate, a dustproof substrate, and a micro lens substrate.

According to such a structure, it is possible to completely divide the element substrate, the counter substrate, the dustproof substrate, and the micro lens substrate used for a liquid crystal display device along the division lines.

A method of manufacturing an electro-optical device of an exemplary aspect of the present invention includes a method of dividing a plurality of substrates according to an exemplary aspect of the present invention. According to such a structure, it is possible to divide a plurality of substrates adhered to each other into individual electro-optical devices with high product yield.

An electro-optical device according to an exemplary aspect of the present invention is manufactured by the method of manufacturing an electro-optical device according to an exemplary aspect of the present invention.

According to such a structure, it is possible to completely divide a plurality of substrates used for electro-optical devices, which are adhered to each other, and to improve the product yield in manufacturing the electro-optical devices.

BRIEF DESCRIPTION OF THE DRAWINGS

FIG. 3 is a schematic of a large element substrate according to the present exemplary embodiment;

FIG. 17 is a schematic illustrating the relationship between the thickness of the lens wafer and the width of a groove when the product yield is 100%.

DETAILED DESCRIPTION OF EXEMPLARY EMBODIMENTS

Figure 1:
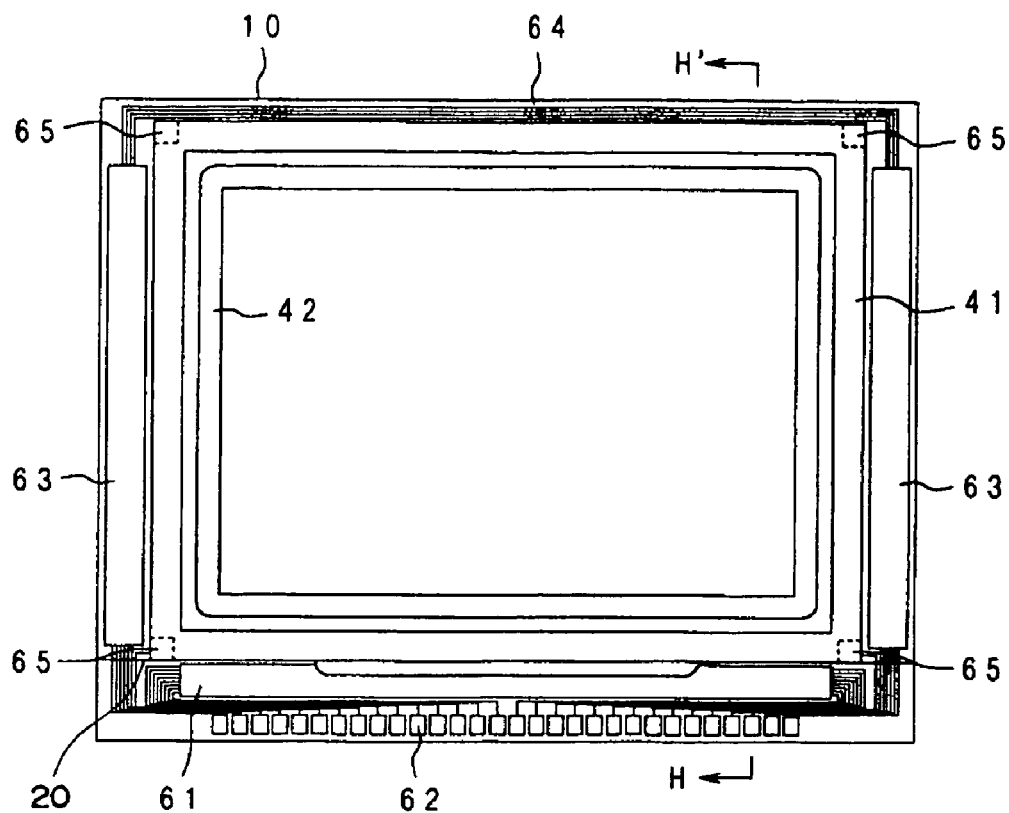
FIG. 1 is a schematic of a liquid crystal display device according to an exemplary embodiment of the present invention.
Figure 2:
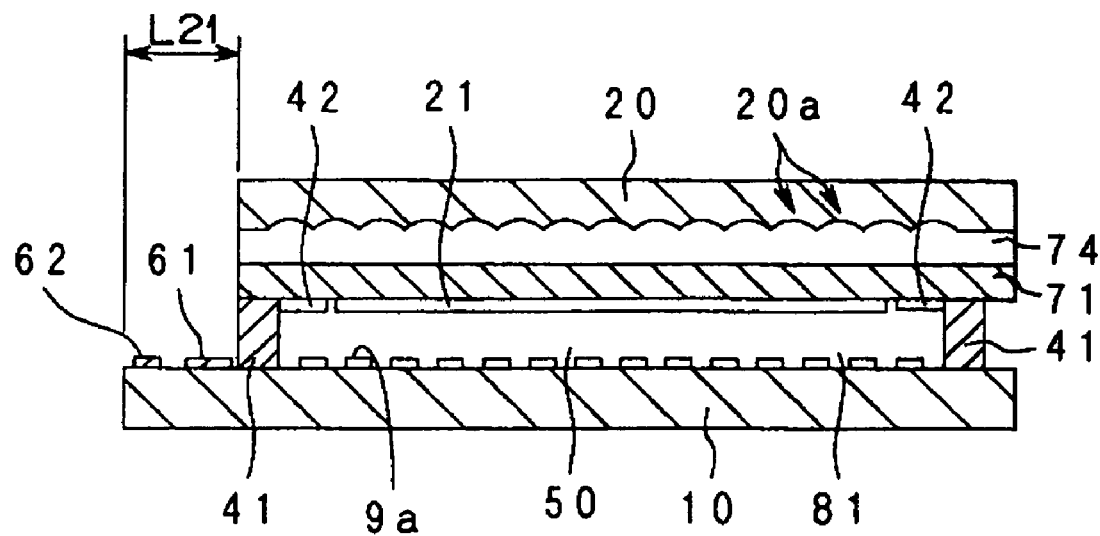
FIG. 2 is a sectional schematic of the liquid crystal display device, which is taken along the plane H–H' of FIG. 1.

Exemplary embodiments of the present invention will now be described in detail with reference to the drawings. FIG. 1 is a schematic of a liquid crystal display device according to an exemplary embodiment of the present invention. According to the present exemplary embodiment, a TFT liquid crystal display device is used as an electro-optical device. FIG. 1 is a schematic of an element substrate, such as a TFT substrate seen from a counter substrate side together with the respective components formed on the element substrate. FIG. 2 is a sectional sectional taken along the plane H–H' of FIG. 1 of a liquid crystal display device after an assembling process is completed.

A liquid crystal display device, such as a liquid crystal panel is constructed by sealing liquid crystal 50 between an element substrate 10, such as a TFT substrate and a counter substrate 20 as illustrated in FIGS. 1 and 2. On the element substrate 10, a plurality of transparent pixel electrodes (ITO) 9a that constitute pixels are arranged in a matrix. A cover glass 71 is adhered to the counter substrate 20 by an adhesive 74. Counter electrodes (ITO) 21 are provided on the entire surface of the region corresponding to the display area of the cover glass 71.

The element substrate 10 includes, for example, a quartz substrate, a glass substrate, and a silicon substrate. The counter substrate 20 includes, for example, a glass substrate and a quartz substrate. Data lines and scanning lines are provided on the element substrate 10 along vertical and horizontal boundaries of the pixel electrodes 9a. Light-shielding films (not shown) are provided on the element substrate 10. The light-shielding films are provided along the data lines and scanning lines in a matrix to correspond to the respective pixels. The light-shielding films prevent reflected light from being incident on channel regions, source regions, and drain regions of TFTs.

The alignment or order of molecular associations of liquid crystal change by a voltage level applied to each pixel, such that light is modulated to perform gray scale display. In a normally white mode, transmittance of incident light is reduced in accordance with the voltage applied to each pixel. In a normally black mode, transmittance of incident light increases in accordance with the voltage applied to each pixel. Thus, the electro-optical device emits light having contrast suitable for image signals.

On the counter substrate 20, light-shielding films (not shown) are provided in the regions that face the regions of the element substrate, in which the data lines, the scanning lines, and the TFTs are formed, specifically, the non-display regions of the respective pixels. The light-shielding films reduce the likelihood or prevent incident light from the counter substrate 20 side from being incident on the channel regions, the source regions, and the drain regions of the TFTs. Counter electrodes (common electrodes) are formed on the light-shielding films on the entire surface of the counter substrate 20. On the surfaces of the element substrate 10 and the counter substrate 20, on the sides where liquid crystal is sealed, alignment films made of polyimide-based polymer resin are laminated and then, are rubbed in a predetermined direction.

The liquid crystal 50 is sealed between the element substrate 10 and the counter substrate 20. Accordingly, the TFTs write image signals supplied by the data lines at a predetermined timing in the pixel electrodes 9a. The alignment or order of the molecular association of the liquid crystal 50 changes in accordance with a potential difference between the pixel electrodes 9a in which the image signals are written and the counter electrodes such that light is modulated to perform gray scale display.

As illustrated in FIGS. 1 and 2, a light-shielding film 42 as a frame that marks out a display region is provided on the counter substrate 20. The light-shielding film 42 is made of a light shielding material that is the same or different from that of the above-described light shielding films.

A sealing material 41 that seals liquid crystal is formed outside the light-shielding film 42 between the element substrate 10 and the counter substrate 20. The sealing material 41 is arranged to almost coincide with the outline of the counter substrate 20 to adhere the element substrate 10 and the counter substrate 20 to each other.

According to the present exemplary embodiment, the sealing material 41 is arranged to almost coincide with the outline of the counter substrate 20. During manufacturing, the liquid crystal 50 is dropped to the inside of the sealing material 41 and is sealed between the counter substrate 20 and the element substrate 10 in the liquid crystal display device, which is a dropping and adhering method. However, the sealing material 41 may not be formed in part of one side of the element substrate 10 such that a liquid crystal implanting opening to implant the liquid crystal 50 into the gap between the element substrate 10 and the counter substrate 20 that are adhered to each other is formed and that, after the liquid crystal is implanted into the liquid crystal implanting opening, the liquid crystal implanting opening may be sealed by a sealing material, which is a implanting opening method.

Outside the sealing material 41 of the element substrate 10, a data line driving circuit 61 and a plurality of mounting terminals 62 are provided along one side of the element substrate 10. Scanning line driving circuits 63 are provided along two sides adjacent to the one side. A plurality of wiring lines 64 to connect the scanning line driving circuits 63 to each other, provided on both sides of the screen display region, are provided on the remaining one side of the element substrate 10. Electric connection materials 65 to electrically connect the element substrate 10 and the counter substrate 20 to each other are provided at least one of the corners of the counter substrate 20.

As illustrated in FIG. 2, a plurality of concave portions 20a are formed on the counter substrate 20 on the emission surface side. The cover glass 71 is adhered to the emission surface of the counter substrate 20 by the adhesive material 74. Since the refractive index of the adhesive material 74 is higher than the refractive index of the counter substrate, incident light is focused on the pixel electrodes 9a.

Next, processes of manufacturing the liquid crystal display device will be described.

FIG. 3 is a schematic of a large element substrate in which the plurality of element substrates 10 of each liquid crystal display device according to the present exemplary embodiment are arranged. The large element substrate is referred to as a large element substrate (hereinafter, "TFT wafer"), on which TFT circuits are formed by semiconductor manufacturing process.

Figure 4:
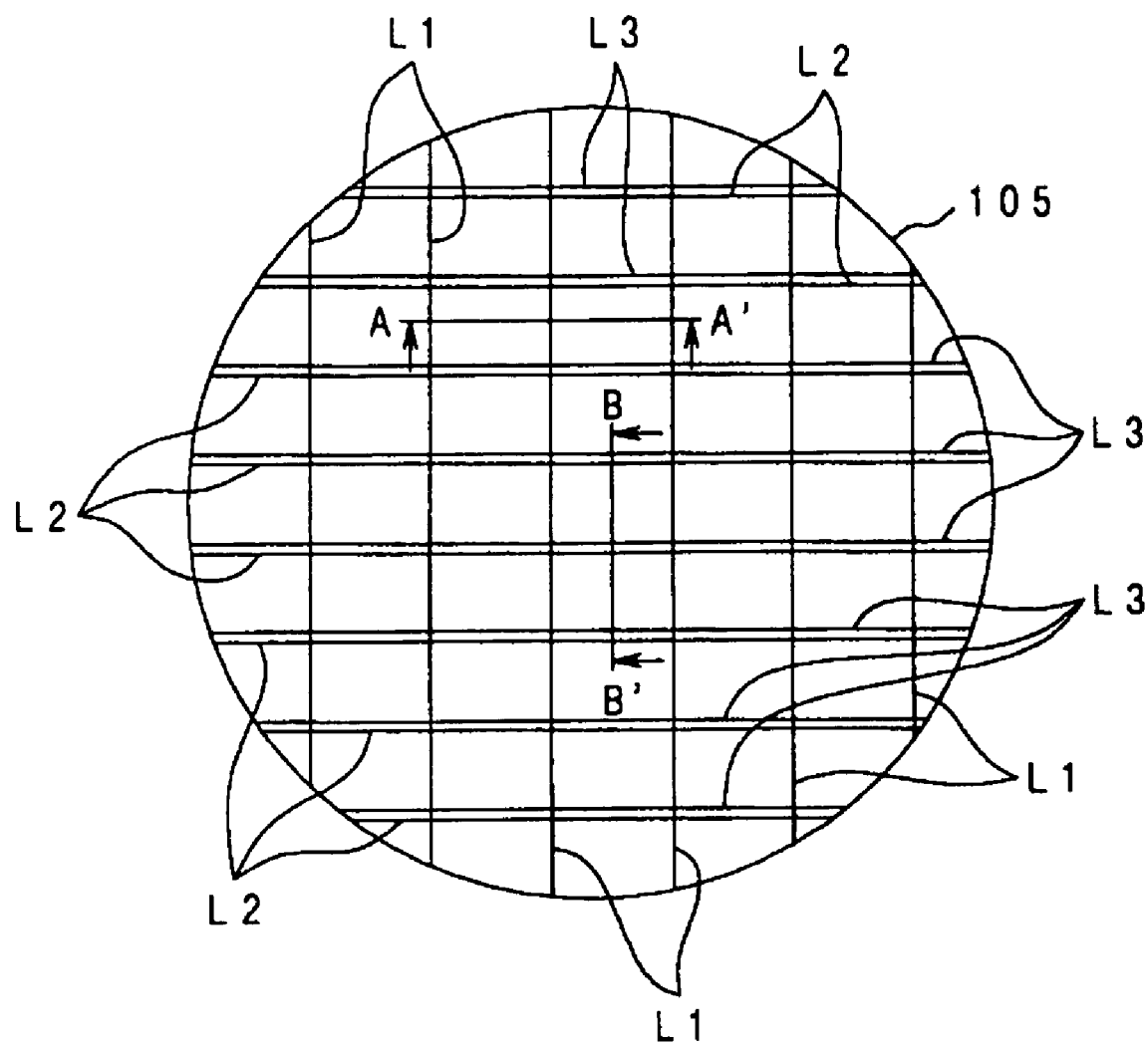
FIG. 4 is a schematic of a large counter substrate according to the present exemplary embodiment.

FIG. 4 is a schematic of a large counter substrate in which the plurality of counter substrates 20 of each liquid crystal display device according to the present exemplary embodiment is arranged. A large cover glass substrate 103 (hereinafter, a "cover glass wafer") that becomes the cover glass 71 is adhered to a large counter substrate 102 by the adhesive material 74.

Hereinafter, in order to simplify description, an object obtained by adhering a large lens substrate 102 (hereinafter, "a lens wafer"), and a glass wafer 103 to each other is referred to as a large substrate wafer 105. A TFT wafer 101, the lens wafer 102, and the glass wafer 103 have the same shape.

In FIGS. 3 and 4, L1, L2, and L3 denote division lines. The division lines are lines along which the liquid crystal display devices as liquid crystal panels are cut out to be divided from each other. As described later, the respective substrates, such as the TFT wafer 101, the lens wafer 102, and the cover glass wafer 103 are divided from each other along the division lines to manufacture individual liquid crystal display devices.

Figure 5:
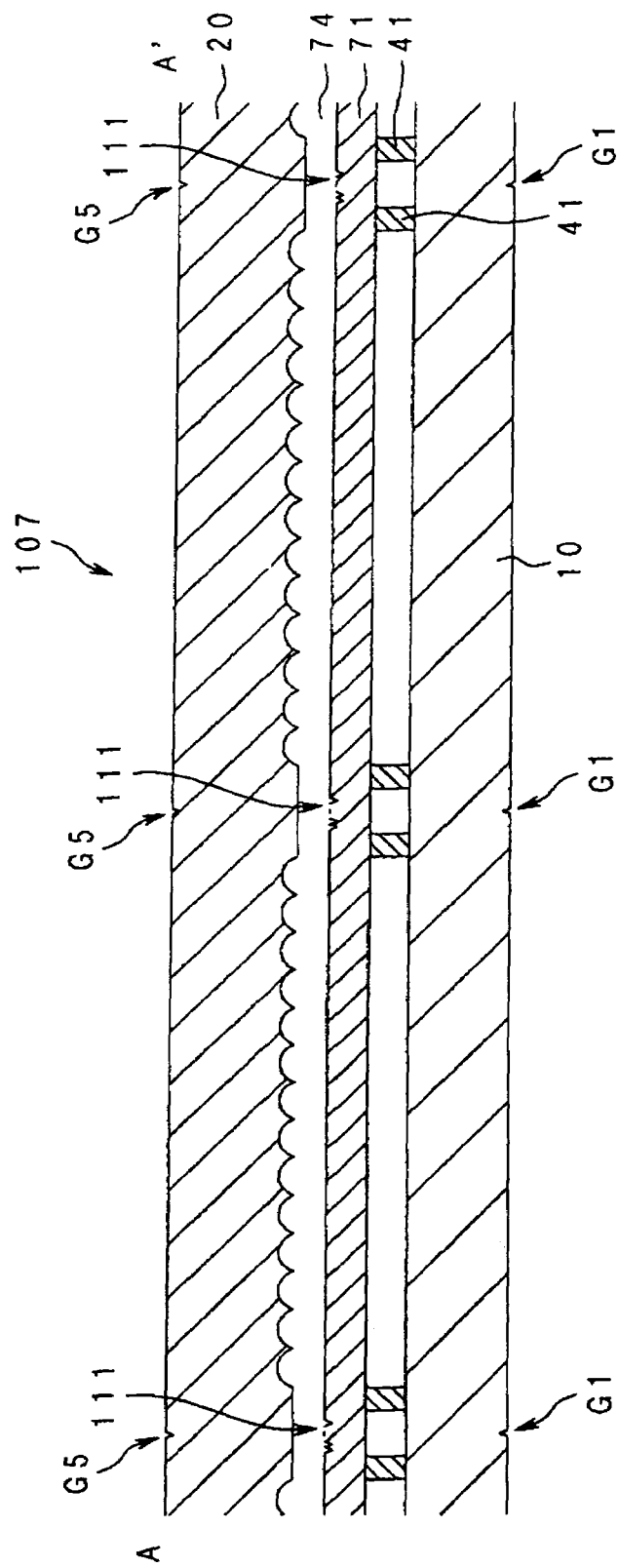
FIG. 5 is a sectional schematic of an adhered substrate, which is taken along the plane A–A' in FIGS. 3 and 4.
Figure 6:
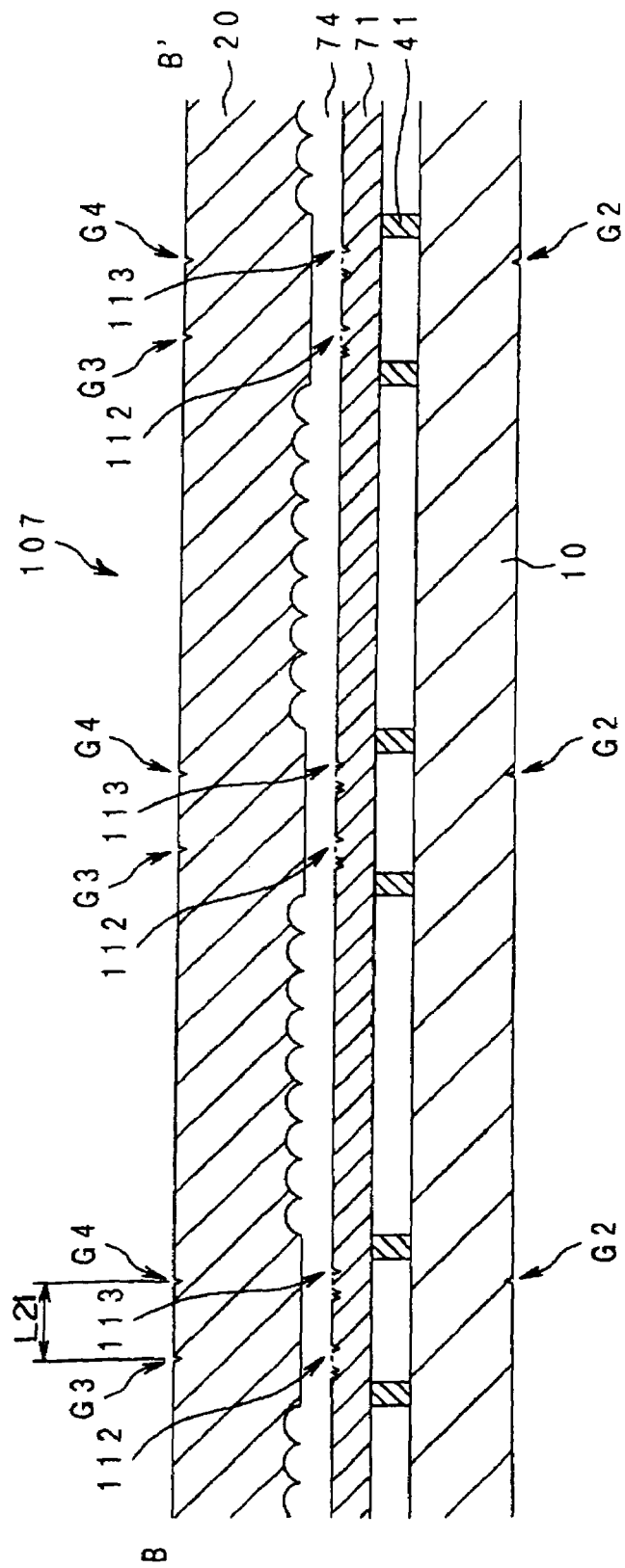
FIG. 6 is a sectional schematic of the adhered substrate, which is taken along the plane B–B' in FIGS. 3 and 4.

FIG. 5 is a schematic of a substrate (hereinafter, an "adhered substrate") 107 obtained by adhering the TFT wafer 101 illustrated in FIG. 3 to the counter substrate wafer 105 illustrated in FIG. 4 with the liquid crystal interposed. FIG. 5 is a sectional schematic of the adhered substrate 107 taken along the plane A–A' in FIGS. 3 and 4. FIG. 6 is a sectional schematic of the adhered substrate 107 taken along the plane B–B' in FIGS. 3 and 4.

As illustrated in FIGS. 5 and 6, a plurality of grooves 111, 112, and 113 are formed on the cover glass wafer 103 along division lines L1, L2, and L3. That is, the cover glass wafer 103 is previously half cut. Each of the grooves 111, 112, and 113 includes a plurality of grooves. The grooves 111, 112, and 113 are provided on the surface of the cover glass wafer 103, which faces the lens wafer 102, when the cover glass wafer 103 and the lens wafer 102 are adhered to each other by the adhesive 74. Specifically, the cover glass wafer 103 and the lens wafer 102 are adhered to each other on the surface where the grooves 111, 112, and 113 are formed. The grooves 111 are formed on the cover glass wafer 103 to be in the positions of the division lines L1 in FIGS. 3 and 4 when the lens wafer 102 and the cover glass wafer 103 are adhered to each other. The grooves 112 are formed on the cover glass wafer 103 to be in the positions of the division lines L3 in FIGS. 3 and 4 when the lens wafer 102 and the cover glass wafer 103 are adhered to each other. The grooves 113 are formed on the cover glass wafer 103 to be in the positions of division lines L2 in FIGS. 3 and 4 when the lens wafer 102 and the cover glass wafer 103 are adhered to each other. To be specific, as described later, since each of the grooves 111, 112, and 113 includes a plurality of grooves, a plurality of grooves are formed on the surface of the cover glass wafer 103 in a predetermined width with respect to each of the division lines L1, L2, and L3 (which will be described using FIG. 8).

Also, the grooves 111, 112, and 113 each having a plurality of grooves are not provided in regions not to be divided, for example, regions where cracks may be generated in the sealing material 41 when the respective substrates are divided. Thus, the width in which the plurality of grooves are provided is the width in which undesired divisions do not occur due to cracks, for example, the width in which the regions not to be divided, as described above, are not included.

Furthermore, the respective grooves in the grooves 111, 112, and 113 are formed by dry etching. For example, after forming phosphorus (P) doped poly silicon on the cover glass wafer 103 to a thickness of 800 nm (8000 Å), poly silicon is dry etched using photoresist of a predetermined shape as a mask and is partially removed to form the patterns of the respective grooves of the grooves 111, 112, and 113. Then, the surface of the cover glass 103, such as quartz, is dry etched using partially removed poly silicon as mask to form the respective grooves of the grooves 111, 112, and 113. Finally, poly silicon is removed by tetra methyl ammonium hydroxide (TMAH). Here, the respective grooves in the grooves 111, 112, and 113 are formed by a dicing method, a method of using laser light, a sand blast method, a method of using wet etching as well as by a method of using dry etching.

A method of manufacturing individual liquid crystal display devices by dividing the adhered substrate 107 into individual liquid crystal display devices will be simply described. A plurality of grooves G1 and G2 are formed on the external surface of the element substrate of the TFT wafer 101 in the adhered substrate 107 (refer to FIGS. 5 and 6). The positions in which the grooves G1 and G2 are formed correspond to the division lines L1 and L2 in FIGS. 3 and 4. After forming the grooves G1 and G2, positions corresponding to the respective grooves G1 and G2 are sequentially pressed using a break bar from the external surface of the counter substrate 20 of the adhered substrate 107, such that bending stress is applied to the respective grooves G1 and G2 and that cracks are generated in the element substrate 10 to divide the element substrate 10.

Next, a plurality of grooves G3, G4, and G5 are formed on the external surface of the counter substrate 20 of the counter substrate wafer 105 in the adhered substrate 107. The positions in which the grooves G3 are formed correspond to the division lines L3 in FIG. 4. The positions in which the grooves G4 are formed correspond to the division lines L2 in FIG. 4. The positions in which the grooves G5 are formed correspond to the division lines L1 in FIG. 4. After forming the respective grooves G3, G4, and G5, positions corresponding to the respective grooves are sequentially pressed using the break bar from the external surface of the element substrate 10 of the adhered substrate 107, such that bending stress is applied to the respective grooves and that cracks are generated in the counter substrate 20 to divide the counter substrate 20. Accordingly, the adhered substrate 107 is divided into individual liquid crystal display devices.

Here, part of the counter substrate wafer 105 that faces the region of the data line driving circuit 61 and the mounted terminals 62 on the element substrate 10 must be removed from the adhered substrate 107. In FIG. 2, in the width corresponding to the width L21 of the region in which the data line driving circuit 61 and the mounted terminals 62 are provided, the grooves G3 and G4 are formed to be separated from each other by a predetermined distance. Specifically, on the counter substrate wafer 105, the grooves G3, G4 and G5 to remove part of the counter substrate wafer 105 that faces the region of the data line driving circuit 61 and the mounted terminals 62 on the element substrate 10 are formed. Positions corresponding to the respective grooves G3, G4, and G5 are sequentially pressed using the break bar as described above to divide the counter substrate 20.

Figure 7A:
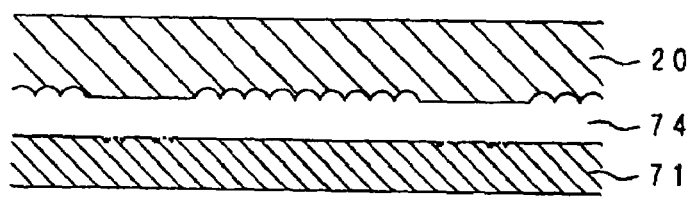
FIG. 7 is a schematic for illustrating an example of processes of manufacturing a liquid crystal display device.
Figure 7B:
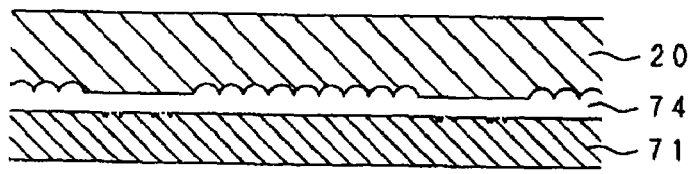
Figure 7C:
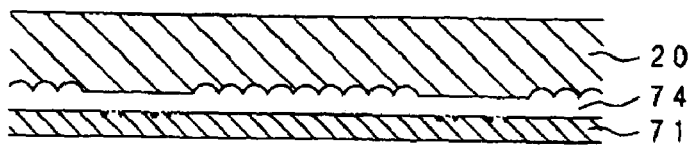
Figure 7D:
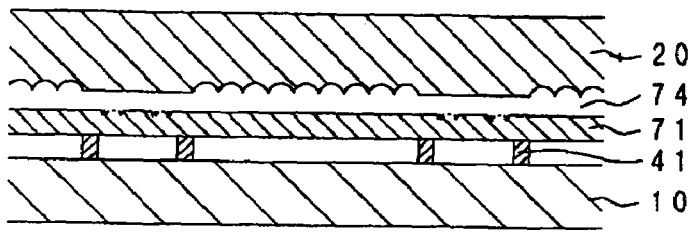
Figure 7E:
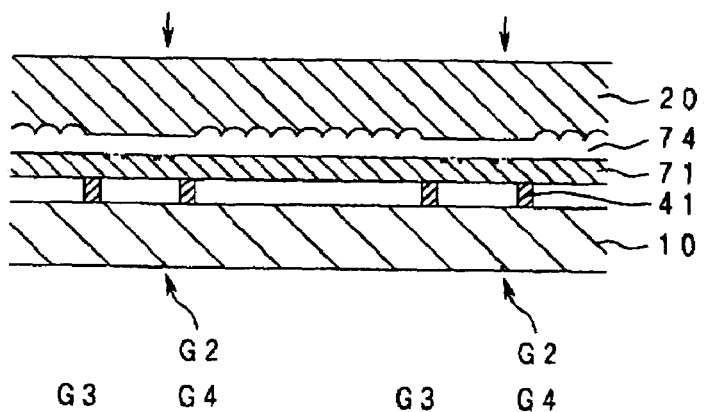
Figure 7F:
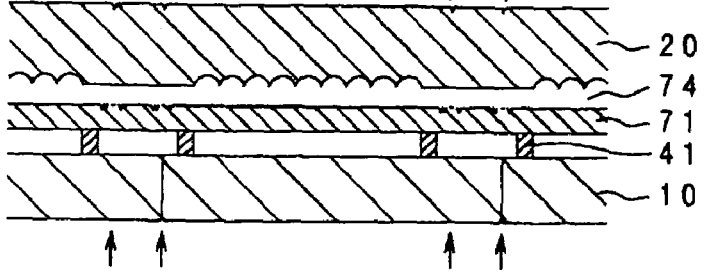
Figure 8:
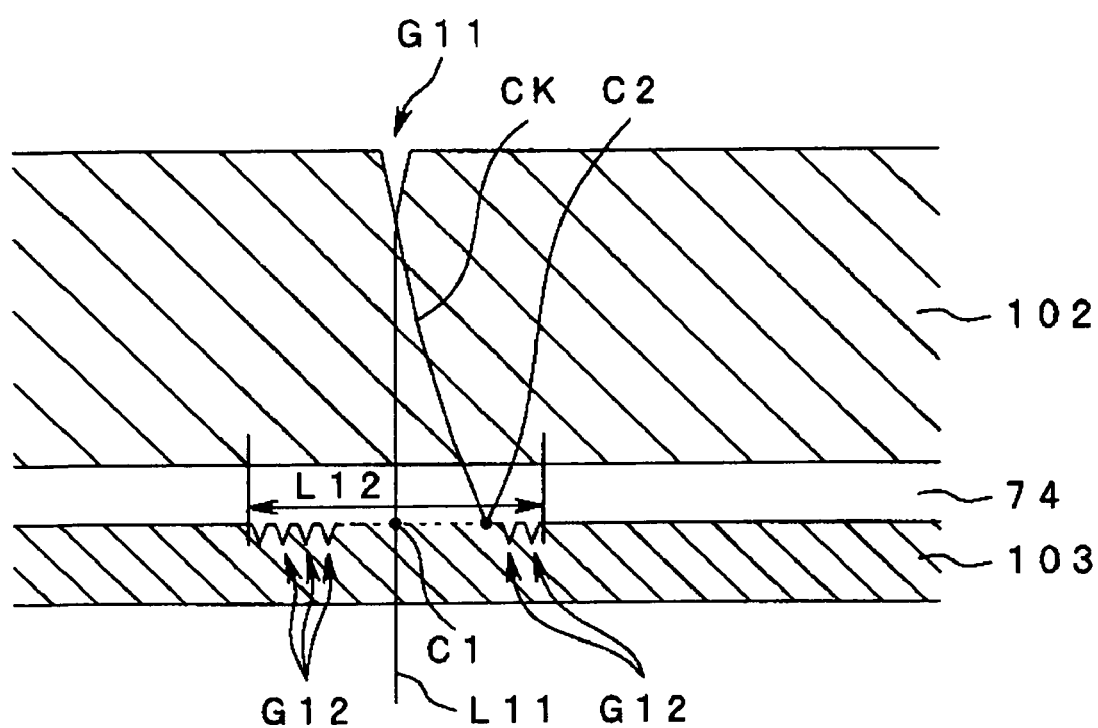
FIG. 8 is a schematic for illustrating the relationship between the positions of the grooves formed on two wafers.

With reference to FIGS. 7 and 8, processes of dividing the adhered substrate 107 will be described in detail.

FIG. 7 is a view illustrating processes of manufacturing the liquid crystal display device. FIG. 7 illustrates only the sections taken along the plane B–B' in FIG. 3 and the sections taken along the plane A–A' will be omitted.

As illustrated in FIG. 7A, the lens wafer 102 that becomes the counter substrate 20 of each liquid crystal display device and the cover glass wafer 103 that becomes the cover glass of each liquid crystal display device are provided. The thickness of the counter wafer 105 is, for example, 1.2 mm. The thickness of the cover glass wafer 103 is also, for example, 1.2 mm. A plurality of grooves having a depth of 15 μm are formed on one surface of the cover glass wafer 103 along the division lines L1, L2, and L3.

As illustrated in FIG. 7B, the lens wafer 102 and the cover glass wafer 103 are adhered to each other by an adhesive 74, such as ultraviolet curable resin having high refractive index, while adjusting the concave potions of the lens wafer 102 to the portions on the cover glass wafer 103, in which the grooves are not formed. The thickness of the adhesive 74 is, for example, 10 μm. After adhering the lens wafer 102 and the cover glass wafer 103 to each other, the surface opposite to the surface of the cover glass wafer 103, which faces the lens wafer 102, is polished, such that, as illustrated in FIG. 7C, the thickness of the cover glass wafer 103 is, for example, 30 μm.

FIG. 8 is a schematic to illustrate the position relationship between the grooves formed on the lens wafer 102 and the grooves formed on the cover glass wafer 103. Here, a method of dividing the two substrates that are adhered to each other will be described in detail. First, a groove G11 (that is G3, G4, or G5) is formed on the external surface of one substrate, here, the lens wafer 102 between two substrates that are adhered to each other, here, the lens wafer 102 and the cover glass wafer 103, along a division line L11.

Next, the groove G11 is pressed from the surface opposite to adhered surface of another substrate, here, the cover glass wafer 103 using the break bar to apply bending stress to the two substrates. Due to the bending stress, stress is concentrated on the deepest portion of the groove G11 to generate the crack CK. As illustrated in FIG. 8, the crack CK proceeds from the deepest portion of the groove G11 to the inside of the one substrate.

As illustrated in FIG. 8, the crack CK does not straightly proceed along the division line L11 in most cases. Thus, the crack CK deviates from the division line L11 and reaches the surface of the layer of the adhesive 74, which faces the cover glass wafer 103. Thus, the position C2 (which is a point in FIG. 8, however, is a line in a plane parallel to the surface of the lens wafer 102, on which grooves are formed) on the surface that faces the cover glass wafer 103 of the layer of the adhesive 74, in which the crack is generated, cannot be described to be on the division line L11.

Thus, according to the present exemplary embodiment, as illustrated in FIG. 8, a plurality of grooves G12 (such as the plurality of grooves in the respective grooves 111, 112, and 113) are formed on the counter substrate 20 side surface of the cover glass wafer 103 that becomes the cover glass 71 in a predetermined width L12 based on the point C1 (which is a point in FIG. 8, however, is a line in a plane parallel to the surface of the lens wafer 102, on which grooves are formed), in which a normal line orthogonal to the surface of the lens wafer 102 from the groove G11 (such as G3, G4, or G5) formed on the lens wafer 102 that becomes the counter substrate 20 intersects the counter substrate 20 side surface of the cover glass 103. For example, the predetermined width L12 is 0.2 mm. The depth and the width of the respective grooves G12 are 15 μm and 3 to 5 μm, respectively. The number of grooves G12 formed in the predetermined width L12 is 30. The aspect ratio (the ratio of the depth to the width) of the grooves G12 may be, for example, in the range of 0.01 to 30, in particular, in the range of 1 to 10.

When the cover glass is pressed along the groove G11 using the break bar, bending stress is applied to the two substrates to generate the crack CK, the predetermined width L12 is determined such that the position C2 in which the crack is generated on the surface that faces the cover glass wafer 103 of the layer of the adhesive 74 is in the predetermined width L12.

Figure 14:
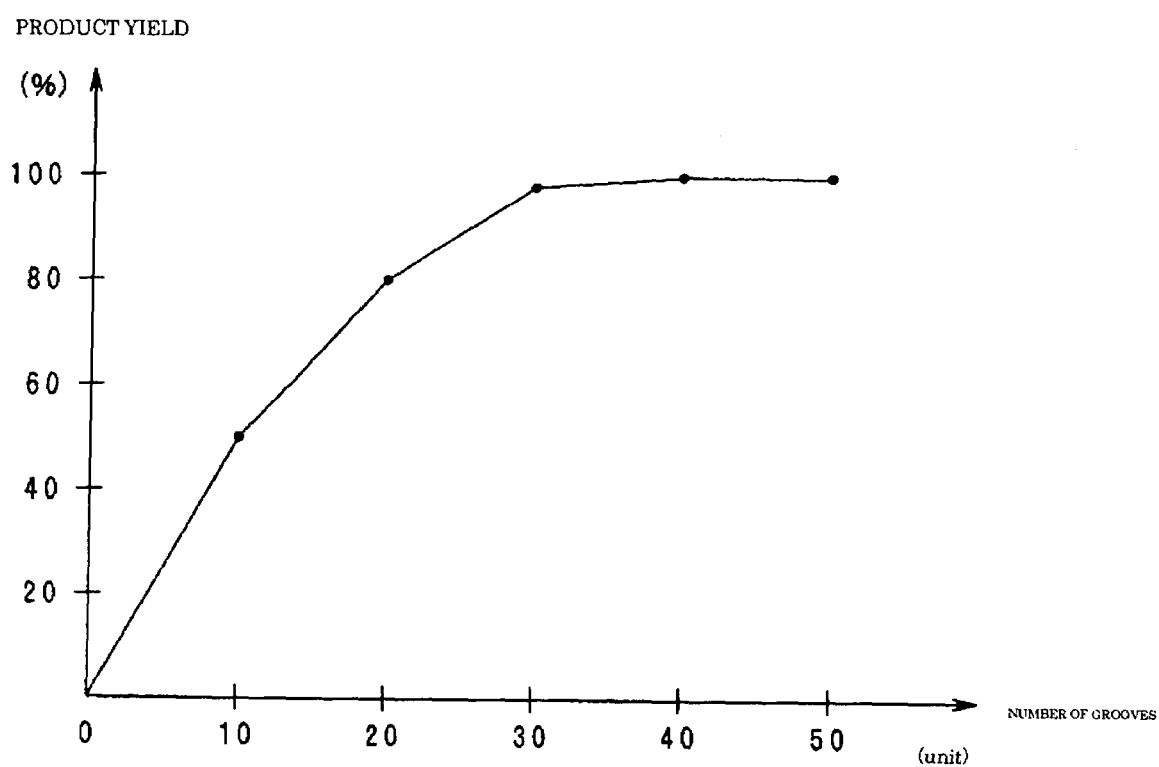
FIG. 14 is a schematic illustrating the relationship between the number of grooves and the product yield.

The predetermined width L12 is determined in accordance with parameters, such as the thickness and material of the lens wafer 102. The depth of the groove G11, however, is determined as the result of an experiment. FIG. 14 is a schematic illustrating the relationship between the number of grooves G12 and the product yield based on the result of an experiment. According to this experiment, a groove has a width of 5 μm and a plurality of lines are provided to be separated from each other by a distance of 5 μm such that division lines are provided in the center. At this time, the thickness of the lens wafer 102 is 1.2 mm. As illustrated in FIG. 14, the product yield is 50% when 10 grooves are provided, 80% when 20 grooves are provided, 98% when 30 grooves are provided, 100% when 40 grooves are provided, and 100% when 50 grooves are provided.

Figure 15:
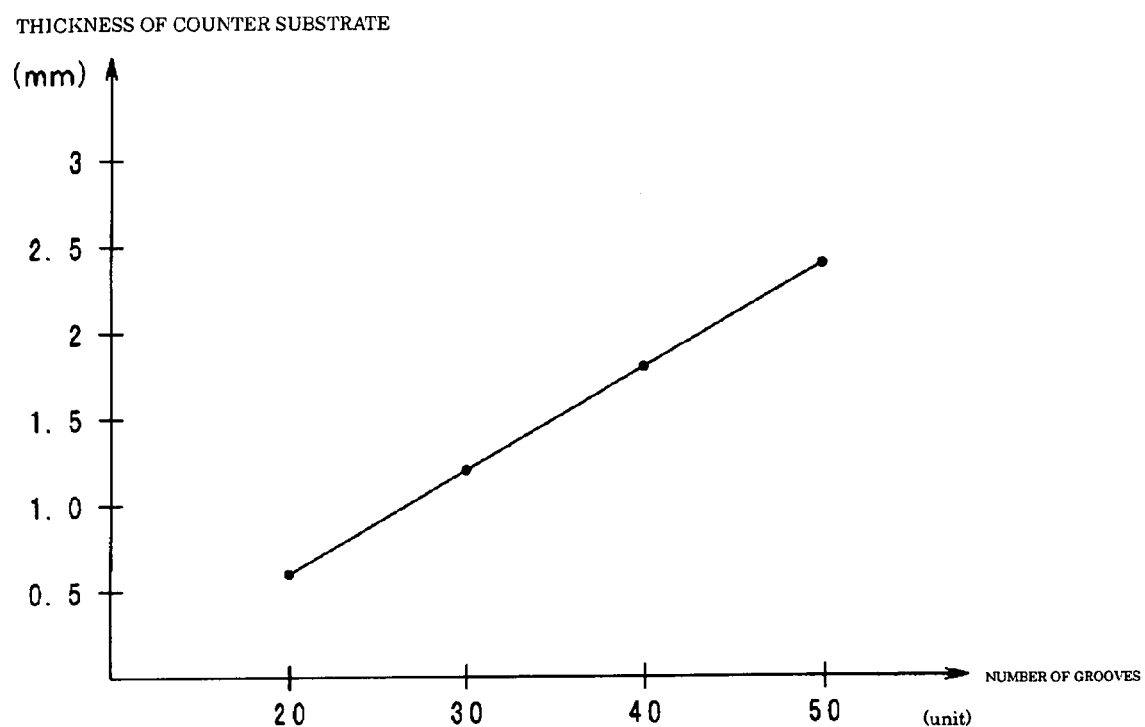
FIG. 15 is a schematic illustrating the relationship between the thickness of a lens wafer and the number of grooves when the product yield is 100%.

FIG. 15 is a schematic illustrating the relationship between the thickness of the lens wafer 102 that becomes the counter substrate 20 and the number of grooves G12 when the product yield is 100% based on the result of an experiment. According to this experiment, a groove has a width of 5 μm and a plurality of lines are provided to be separated from each other by a distance of 5 μm such that division lines are provided in the center. As illustrated in FIG. 15, in the case where the thickness of the lens wafer 102 is 0.6 mm, when the width L12 amounts to 33% of the thickness (0.2 mm), the product yield is 100%. In the case where the thickness of the lens wafer 102 is 1.2 mm, when the width L12 amounts to 25% of the thickness (0.3 mm), the product yield is 100%. In the case where the thickness of the lens wafer 102 is 1.8 mm, when the width L12 amounts to 22% of the thickness (0.4 mm), the product yield is 100%. In the case where the thickness of the lens wafer 102 is 2.4 mm, when the width L12 amounts to 21% of the thickness (0.5 mm), the product yield is 100%.

Thus, the plurality of grooves G12 are provided on the surface of the cover glass wafer 103, which faces the lens wafer 102, along the division line L12 in the width where the product yield is approximately 100% with respect to the thickness of the lens wafer 102 that becomes the counter substrate 20. For example, in FIG. 10, the plurality of grooves G12 are provided in the width L12 that amounts to approximately 20% to 33% of the thickness of the lens wafer 102 to make the product yield approximately 100%.

However, even if the product yield is not 100%, as illustrated in FIG. 14, when the plurality of grooves G12 are provided in a width no less than 0.1 mm (the number of grooves G12 is 10) in the case where the width L12 is at least 8.3% (approximately 8%) of the thickness of the lens wafer 102, specifically, where the thickness of the lens wafer 102 is 1.2 mm, the product yield is no less than 50%. When the plurality of grooves G12 are provided in a width no less than 0.2 mm (the number of grooves G12 is 20) in the case where the width L12 is at least 16.7% (approximately 17%) of the thickness of the lens wafer 102, that is, where the thickness of the lens wafer 102 is 1.2 mm, the product yield is no less than 80%. Furthermore, when the plurality of grooves G12 are provided in a width no less than 0.3 mm (the number of grooves G12 is 30) in the case where the width L12 is at least 25% of the thickness of the lens wafer 102, that is, where the thickness of the lens wafer 102 is 1.2 mm, the product yield is no less than 98%. Furthermore, when the plurality of grooves G12 are provided in a width no less than 0.4 mm (the number of grooves G12 is 40) in the case where the width L12 is at least 33% of the thickness of the lens wafer 102, that is, where the thickness of the lens wafer 102 is 1.2 mm, the product yield is 100%.

Thus, it is possible to determine the width in which the plurality of grooves G12 are provided such that the product yield is no less than a desired value. That is, since a crack is generated in the cover glass wafer 103 in any one of the plurality of grooves G12, such that the cover glass wafer 103 is completely divided, it is possible to reduce or prevent division inferiority from being generated in the desired product yield. For example, in the case where the thickness of the lens wafer 102 is 1.2 mm, when it is desired that the product yield is about 50%, the number of grooves G12 is determined as 10. When it is desired that the product yield is about 80%, the number of grooves G12 is determined as 20. When it is desired that the product yield is about 98%, the number of grooves G12 is determined as 30. When it is desired that the product yield is 100%, the number of grooves G12 is determined as no less than 40.

Next, back to the division processes of FIG. 7, the TFT wafer 101 that becomes the TFT substrate 10 and the counter substrate wafer 105 are adhered to each other with their positions adjusted.

Next, as illustrated in FIG. 7E, grooves G1 and G2 are formed on the external surface of the TFT wafer 101, that is, on the surface opposite to the surface that faces the cover glass wafer 103 by scribing, dicing, and laser. After forming the grooves G1 and G2 on the external surface of the TFT wafer 101, the positions corresponding to the grooves G1 and G2 are sequentially pressed using the break bar from the external surface of the counter substrate 20 of the adhered substrate 107, that is, from the surface opposite to the surface that faces the cover glass wafer 103 in the direction marked with arrows as illustrated in FIG. 7E, such that cracks are generated in the TFT wafer 101 to divide the TFT wafer 101.

Next, as illustrated in FIG. 7F, the grooves G3, G4, and G5 are formed on the external surface of the lens wafer 102, that is, on the surface opposite to the surface that faces the cover glass wafer 103 by scribing, dicing, and laser. After forming the grooves G3, G4, and G5 on the external surface of the lens wafer 102, the positions corresponding to the grooves G3, G4, and G5 are sequentially pressed using the break bar from the external surface of the TFT wafer 101 of the adhered substrate 107, that is, from the surface opposite to the surface that faces the cover glass wafer 103 in the direction marked with arrows as illustrated in FIG. 7F, such that cracks are generated in the lens wafer 102 to divide the counter substrate wafer 105.

Here, with respect to the grooves G3, G4, and G5, since the plurality of grooves G12 (such as the plurality of grooves in each of the grooves 111, 112, and 113) are formed on the counter substrate 20 side surface of the cover glass wafer 103 that becomes the cover glass 71 in the width illustrated in FIG. 8, it is possible to completely divide the counter substrate wafer 105. When the width, in which the plurality of grooves G12 are provided, is determined in accordance with the desired product yield, it is possible to divide the counter substrate wafer 105 without causing division inferiority at the desired product yield.

Figure 9:
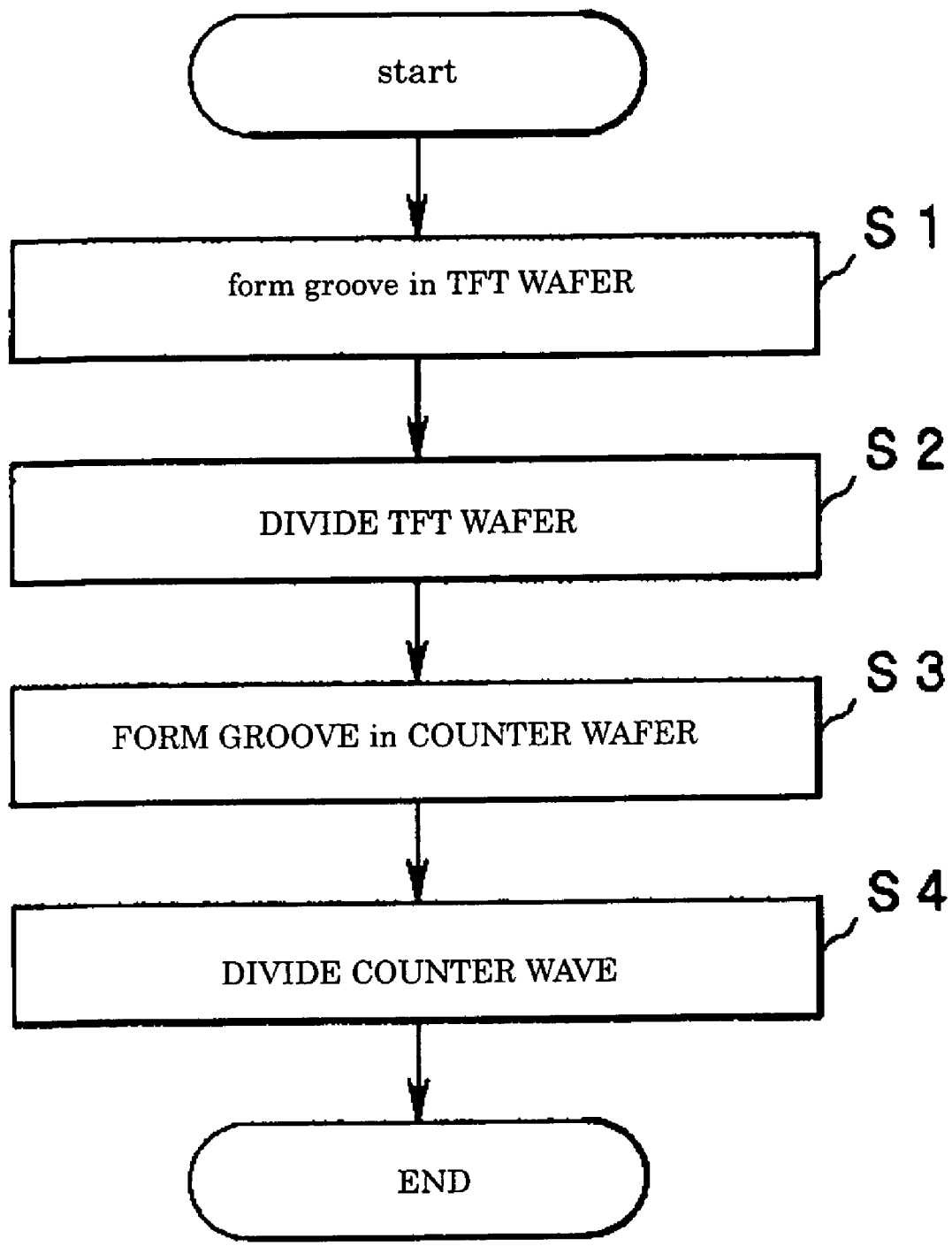
FIG. 9 is a schematic illustrating processes of dividing the adhered substrate.

Here, the order in which the TFT wafer 101 and the counter substrate wafer 105 are divided will be described. FIG. 9 is a flowchart illustrating processes of dividing the adhered substrate. In FIG. 9, dividing grooves are formed on the surface of the TFT wafer 101 (S1). Next, the TFT wafer 101 is divided (S2). Subsequently, dividing grooves are formed on the surface of the counter substrate wafer 105 (S3). Then, the counter substrate wafer 105 is divided (S4).

After dividing the TFT wafer 101, the counter substrate wafer 105 is divided. This is because, since the surface of the TFT wafer 101, on which TFT circuits are formed using high temperature poly silicon, contracts to a larger degree than the surface of the TFT wafer 101, on which the TFT circuits are not formed, the surface of the TFT wafer 101, on which the TFT circuits are formed, contracts, and the surface of the TFT wafer 101, on which the TFT circuits are not formed, are bent like being expanded. Thus, the adhered substrate 107 must be divided from the TFT wafer 101. Thus, when the TFT wafer 101 is not bent, which is first divided between the TFT wafer 101 and the counter substrate wafer 105 does not matter.

As described above, according to a method of manufacturing the liquid crystal display device of the present exemplary embodiment, it is possible to completely divide the plurality of substrates that are adhered to each other for the liquid crystal display device along the division lines.

The exemplary aspects of the present invention are not only applied to the fabrication of the liquid crystal display device having a micro lens but also to the fabrication of various liquid crystal display devices, such as a liquid crystal display device that does not have a micro lens, specifically, to the fabrication of the liquid crystal display device including the processes of dividing the substrates that are adhered to each other.

For example, in an adhered substrate including a dustproof substrate, a counter substrate, and an element substrate, cracks generated in the grooves formed on the dustproof substrate can be applied to dividing the counter substrate or the element substrate adhered to the dustproof substrate in desired positions. Furthermore, for example, in the adhered substrate including the dustproof substrate, the counter substrate, the cover glass, and the element substrate, the cracks generated in the dustproof substrate can be applied to divide the cover glass, the counter substrate, or the element substrate adhered to the dustproof substrate in desired positions.

Hereinafter, application examples will be described with reference to FIGS. 10 to 12.

FIG. 10 is a schematic of the liquid crystal display device that does not have the micro lens. FIGS. 10 and 11 are schematics of examples of the liquid crystal display device that has the micro lens. FIGS. 10, 11, and 12 are schematics illustrating only the portions related to the above-described division lines, in which the sealing material 41 and the adhesive 74 illustrated in FIG. 5 are omitted.

Figure 10A:
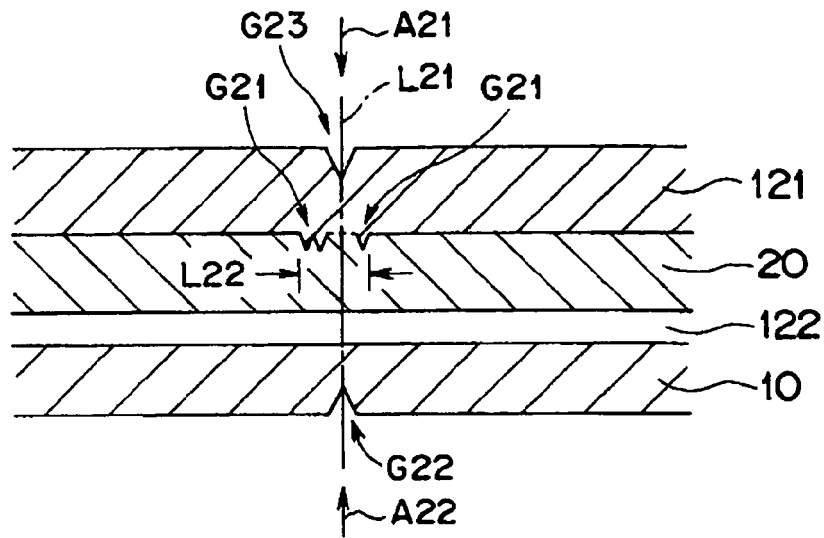
FIG. 10 is a schematic of a liquid crystal display device that does not have a micro lens.

FIG. 10A is a view illustrating a state in which the element substrate 10 and the counter substrate 20 are adhered to each other and in which a dustproof substrate 121, made of dustproof glass, is adhered to the counter substrate 20. Liquid crystal is provided in a gap 122 between the element substrate 10 and the counter substrate 20. In order to divide three large substrates, here, a plurality of grooves G21 are formed on the surface of the counter substrate 20, which faces the dustproof substrate 121 along a division line L21 in a predetermined width L22. On the surface of the counter substrate 20 where the plurality of grooves G21 are formed, the counter substrate 20 and the dustproof substrate 121 are adhered to each other.

As described above, when the plurality of substrates that are adhered to each other are divided, a groove G22 is formed on the surface opposite to the surface of the element substrate, which faces the counter substrate 20 along the division line L21 by performing scribing. The position corresponding to the groove G22 is pressed using the break bar from the surface opposite to the surface of the dustproof substrate 121, which faces the counter substrate 20 in the direction marked with an arrow A21 along the division line L21, such that cracks are generated in the element substrate 10 to divide the element substrate 10. Next, a groove G23 is formed on the surface opposite to the surface of the dustproof substrate 121, which faces the counter substrate 20 along the division line L21 by performing scribing. The position corresponding to the groove G23 is pressed using the break bar from the surface opposite to the surface of the element substrate 10, which faces the counter substrate 20 in the direction marked with an arrow A22 along the division line L21, such that cracks are generated in the dustproof substrate 121 to divide the dustproof substrate 121 and the counter substrate 20.

Thus, FIG. 10A illustrates an example of the liquid crystal display device that does not have a micro lens substrate, in which the three substrates that are adhered to each other can be completely divided along the division line. In FIG. 10(A), the three substrates are divided after being adhered to each other. The division method according to an exemplary aspect of the present invention can also be applied to the case in which the dustproof substrate 121 and the counter substrate 20, that are adhered to each other, are completely divided after adhering the dustproof substrate 121 and the counter substrate 20 to each other. In such a case, for example, after dividing the adhered substrate, each counter substrate for a liquid crystal display device is adhered to a large element substrate and then, the large element substrate is divided into individual liquid crystal display devices.

Figure 10B:
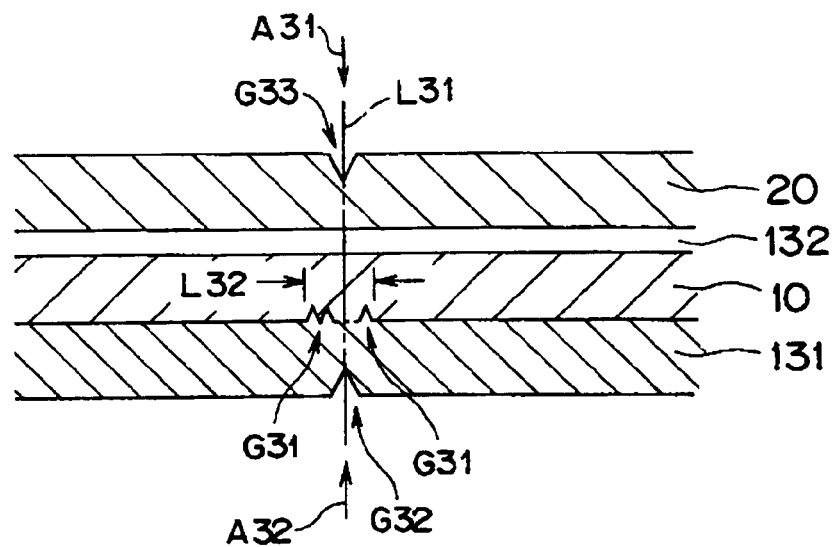

In FIG. 10B, the dustproof substrate in FIG. 10A is provided on the element substrate side. FIG. 10B illustrates a state in which the element substrate 10 and the counter substrate 20 are adhered to each other and in which a dustproof substrate 131 made of dustproof glass is adhered to the element substrate 10. Here, the dustproof glass 131 is adhered to the surface opposite to the surface of the element substrate 10, which faces the counter substrate 20.

Liquid crystal is provided in a gap 132 between the element substrate 10 and the counter substrate 20. In order to divide the three large substrates, here, a plurality of grooves G31 are formed on the surface of the element substrate 10, which faces the dustproof substrate 131 along a division line L31 in a predetermined width L32. On the surface of the element substrate 10 where the plurality of grooves G31 are formed, the element substrate 10 and the dustproof substrate 131 are adhered to each other.

As described above, when the three substrates that are adhered to each other are divided, a groove G32 is formed on the surface of the dustproof substrate 131, which is opposite to the surface that faces the element substrate 10, along the division line L31 by performing scribing. The position corresponding to the groove G32 is pressed using the break bar from the surface opposite to the surface of the counter substrate 20, which faces the element substrate 10 in the direction marked with an arrow A31 along the division line L21, such that cracks are generated in the dustproof substrate 131 to divide the element substrate 10 and the dustproof substrate 131. Next, a groove G33 is formed on the surface of the counter substrate 20, which is opposite to the surface that faces the element substrate 10, along the division line L31 by performing scribing. The position corresponding to the groove G33 is pressed from the surface opposite to the surface of the dustproof substrate 131, which faces the element substrate 10 in the direction marked with an arrow A32 along the division line L31, such that cracks are generated in the counter substrate 20 to divide the counter substrate 20.

Thus, like FIG. 10A, FIG. 10B illustrates an example of the liquid crystal display device that does not have a micro lens structure, in which the three substrates that are adhered to each other can be completely divided along the division line. In FIG. 10B, the three substrates are also divided after being adhered to each other. The division method according to an exemplary aspect of the present invention can also be applied to the case in which the dustproof substrate 131 and the element substrate 10, that are adhered to each other, are completely divided after adhering the dustproof substrate 131 and the element substrate 10 to each other. In such a case, for example, after dividing the adhered substrate, each element substrate for a liquid crystal display device is adhered to a large substrate and then, the large element substrate is divided into individual liquid crystal display devices.

Figure 11A:
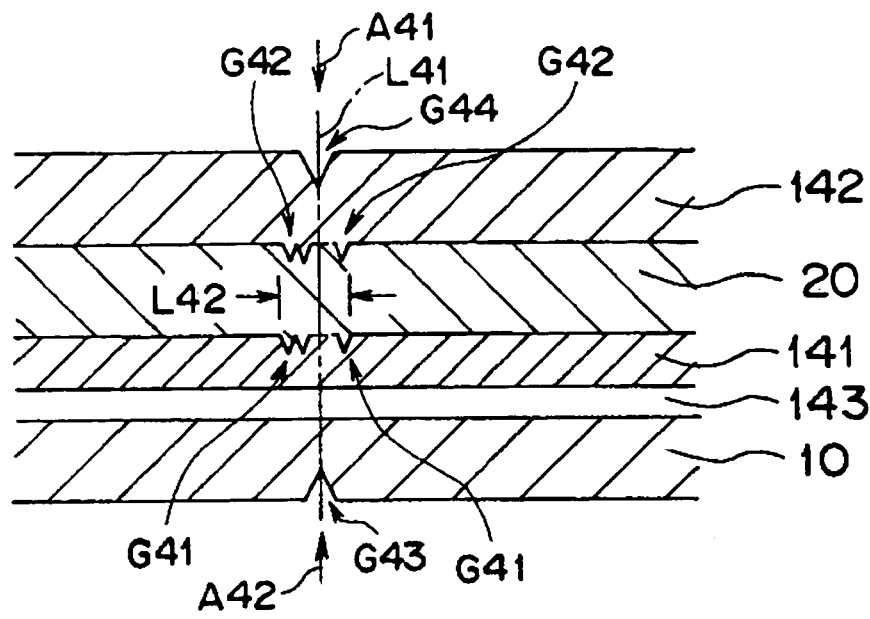
FIG. 11 is a schematic of another example of a liquid crystal display device that has a micro lens.

FIG. 11A illustrates a state in which the element substrate 10 and the counter substrate 20 are adhered to each other and in which a cover glass 141 and a dustproof substrate 142 made of dustproof glass are adhered to the counter substrate 20. Liquid crystal is provided in a gap 143 between the element substrate 10 and the counter substrate 20. In order to divide four large substrates, here, a plurality of grooves G41 and G42 are formed on the surface of the cover glass 141, which faces the counter substrate 20 and on the surface of the counter substrate 20, which faces the dustproof substrate 142, respectively, along a division line L41 in a predetermined width L42. On the surface of the cover glass 141 where the plurality of grooves G41 are formed and on the surface of the counter substrate 20, which is opposite to the surface where the plurality of grooves G42 are formed, the cover glass 141 and the counter substrate 20 are adhered to each other. On the surface of the counter substrate 20 where the plurality of grooves G42 are formed, the dustproof substrate 142 and the counter substrate 20 are adhered to each other.

As described above, when the four substrates that are adhered to each other are divided, a groove G43 is formed on the surface of the element substrate 10, which is opposite to the surface that faces the cover glass 141, along the division line L41 by performing scribing. The portion corresponding to the groove G43 is pressed using the break bar from the surface opposite to the surface of the dustproof substrate 142, which faces the counter substrate 20, in the direction marked with an arrow A41 along the division line L41, such that cracks are generated in the element substrate 10 to divide the element substrate 10. Next, a groove G44 is formed on the surface of the dustproof substrate 142, which is opposite to the surface that faces the counter substrate 20, along the division line L41 by performing scribing. The portion corresponding to the groove G44 is pressed using the break bar from the surface of the element substrate 10, which is opposite to the surface that faces the cover glass 141, in the direction marked with an arrow A42 along the division line L41, such that cracks are generated in the dustproof substrate 142 to divide the dustproof substrate 142, the counter substrate 20, and the cover glass 141.

Thus, according to FIG. 11A, it is possible to completely divide the four substrates that are adhered to each other along the division line.

In FIG. 11A, the four substrates are also divided after being adhered to each other. The division method according to an exemplary aspect of the present invention can be applied to the case in which, after adhering the dustproof substrate 142, the counter substrate 20, and the cover glass 141 to each other, the three substrates that are adhered to each other are divided. In such a case, for example, after dividing the adhered substrate, each counter substrate for a liquid crystal display device is adhered to a large element substrate and then, the large element substrate is divided into individual liquid crystal display devices.

Figure 11B:
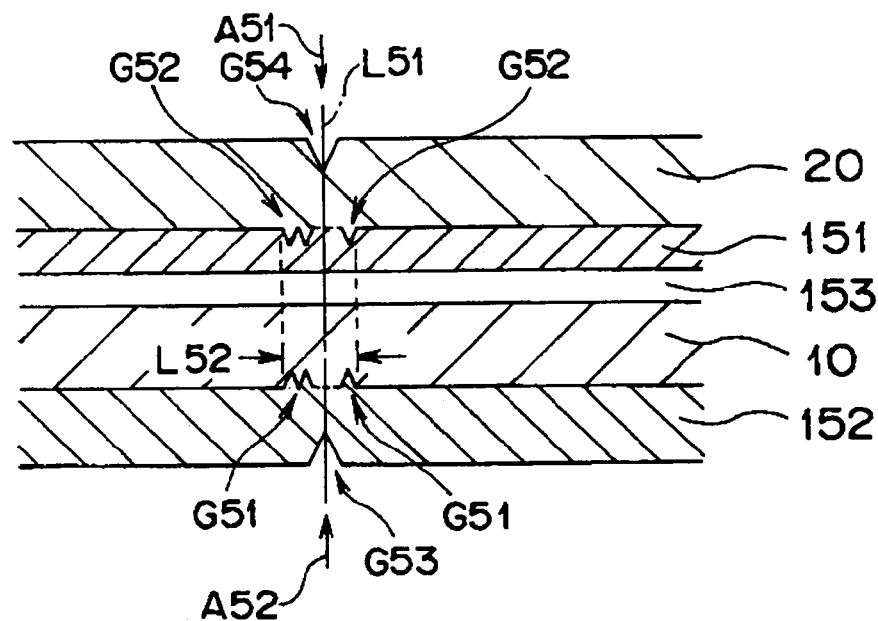

In FIG. 11B, the dustproof substrate in FIG. 11A is provided on the element substrate side. FIG. 11B illustrates a state in which the element substrate 10 and the counter substrate 20 are adhered to each other, in which a cover glass 151 is adhered to the counter substrate 20, and in which a dustproof substrate 152, made of dustproof glass, is adhered to the element surface 10. Liquid crystal is provided in a gap 153 between the element substrate 10 and the cover glass 151.

In order to divide the four large substrates, here, a plurality of grooves G51 are formed on the surface of the element substrate 10, which faces the dustproof substrate 152, along a division line L51 in a predetermined width L52. On the surface of the element substrate 10 where the plurality of grooves G51 are formed, the element substrate 10 and the dustproof substrate 152 are adhered to each other. Furthermore, on the surface of the cover glass 151, which faces the counter substrate 20 of the cover glass 151, a plurality of grooves G52 are formed along the division line L51 in a predetermined with L52. On the surface of the cover glass 151 where the plurality of grooves G52 are formed, the counter substrate 20 and the cover glass 151 are adhered to each other.

As described above, when the four substrates that are adhered to each other are divided, a groove G53 is formed on the surface of the dustproof substrate 152, which is opposite to the surface that faces the element substrate 10, along the division line L51 by performing scribing. The portion corresponding to the groove G53 is pressed using the break bar from the surface of the counter substrate 20, which is opposite to the surface that faces the cover glass 151, in the direction marked with an arrow A51 along the division line L51 such that cracks are generated in the dustproof substrate 152 to divide the element substrate 10 and the dustproof substrate 152. Next, a groove G54 is formed on the surface of the counter substrate 20, which is opposite to the surface that faces the cover glass 151, along the division line L51 by performing scribing. The portion corresponding to the groove G54 is pressed from the surface of the dustproof substrate 152, which is opposite to the surface that faces the element substrate 10, in the direction marked with an arrow A52 along the division line L51, such that cracks are generated in the counter substrate 20 to divide the counter substrate 20 and the cover glass 151.

Thus, like in FIG. 11A, in FIG. 11B, the four substrates that are adhered to each other can be completely divided along the division line.

In FIG. 11B, the four substrates are also divided after being adhered to each other. The division method according to an exemplary aspect of the present invention can also be applied to the case in which the cover glass 151 and the counter substrate 20 that are adhered to each other are completely divided after adhering the cover glass 151 and the counter substrate 20 to each other. In such a case, for example, each counter substrate 20 for a liquid crystal display device, to which a cover glass 151 is adhered, is adhered to a large element substrate 10 to which the dustproof substrate 152 is adhered, and the large element substrate 10 is divided into individual liquid crystal display devices.

Figure 12:
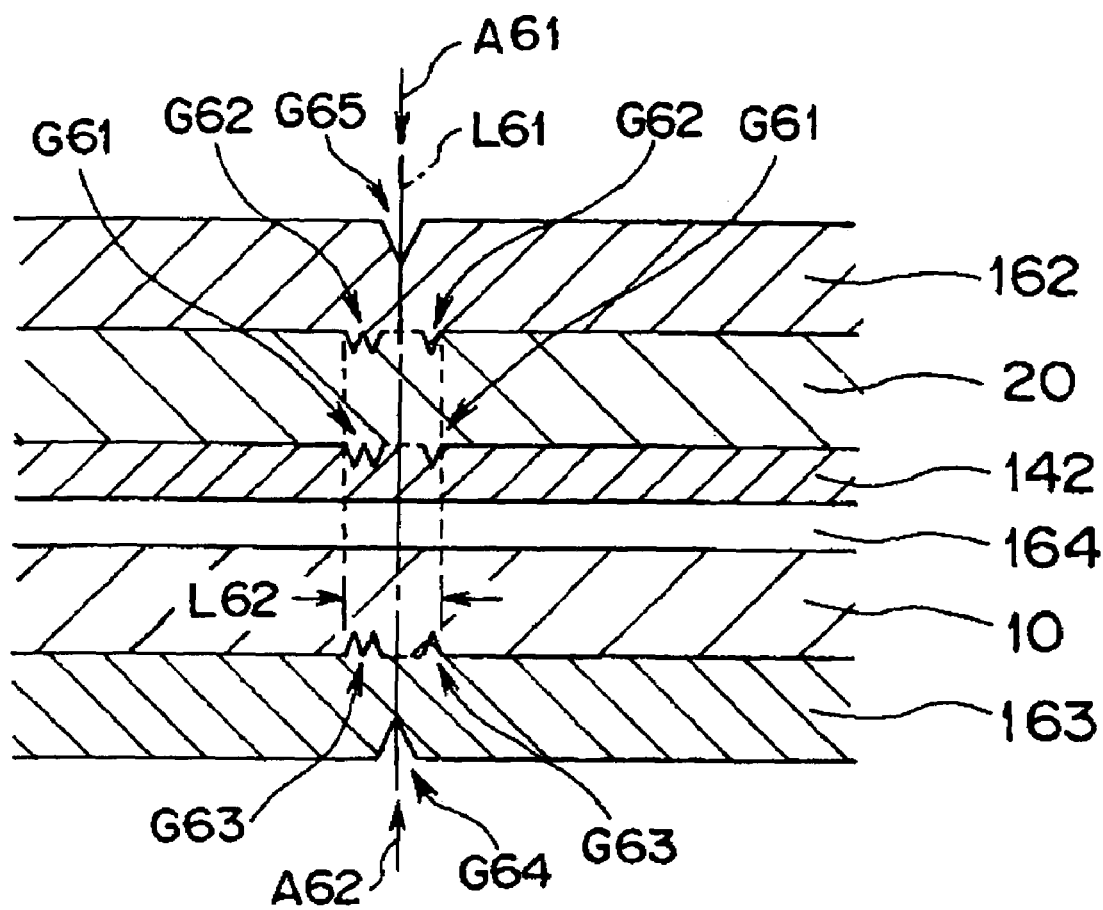
FIG. 12 is a schematic of still another example of a liquid crystal display device that has a micro lens.

FIG. 12 illustrates a state in which the element substrate 10 and the counter substrate 20 are adhered to each other, in which a cover glass 161 and a dustproof substrate 162 made of dustproof glass are adhered to the counter substrate 20, and in which a dustproof substrate 163 made of dustproof glass is adhered to the element substrate 10. Liquid crystal is provided in a gap 164 between the element substrate 10 and the cover glass 161. In order to divide five large substrates, here, a plurality of grooves G61 and G62 are formed on the surface of the cover glass 161, which faces the counter substrate 20, and on the surface of the counter substrate 20, which faces the dustproof substrate 162, respectively, along a division line L61 in a predetermined width L62. On the surface of the cover glass 161 where the plurality of grooves G61 are formed and on the surface of the counter substrate 20, which is opposite to the surface where the plurality of grooves G62 are formed, the cover glass 161 and the counter substrate 20 are adhered to each other. On the surface of the counter substrate 20 where the plurality of grooves G62 are formed, the dustproof substrate 162 and the counter substrate 20 are adhered to each other.

On the surface of the element substrate 10, which faces the dustproof substrate 163, a plurality of grooves G63 are formed along the division line L61 in a predetermined width L62. On the surface of the element substrate 10 where the plurality of grooves G63 are formed, the element substrate 10 and the dustproof substrate 163 are adhered to each other.

As described above, when the five substrates that are adhered to each other are divided, a groove G64 is formed on the surface of the dustproof substrate 163, which is opposite to the surface that faces the element substrate 10, along the division line L61 by performing scribing. The position corresponding to the groove G64 is pressed using the break bar from the surface of the dustproof substrate 162, which is opposite to the surface that faces the counter substrate 20, in the direction marked with an arrow A61 along the division line L61, such that cracks are generated in the dustproof substrate 163 to divide the element substrate 10 and the dustproof substrate 163.

Next, a groove G65 is formed on the surface of the dustproof substrate 162, which is opposite to the surface that faces the counter substrate 20, along the division line L61 by performing scribing. The position corresponding to the groove G65 is pressed using the break bar from the surface of the dustproof substrate 163, which is opposite to the surface that faces the element substrate 10, in the direction marked with an arrow A62 along the division line L61, such that cracks are generated in the dustproof substrate 162 to divide the dustproof substrate 162, the counter substrate 20, and the cover glass 161.

Thus, according to FIG. 12, it is possible to completely divide the five substrates that are adhered to each other along the division line. In FIG. 12, the five substrates are also divided after being adhered to each other. The division method according to an exemplary aspect of the present invention can be applied to the case in which, after adhering the dustproof substrate 162, the counter substrate 20, and the cover glass 142 to each other, the three substrates that are adhered to each other are divided. The division method according to an exemplary aspect of the present invention can be applied to the case in which, after adhering the dustproof substrate 163 and the element substrate 10 to each other, the dustproof substrate 163 and the element substrate 10 that are adhered to each other are divided.

Figure 13:
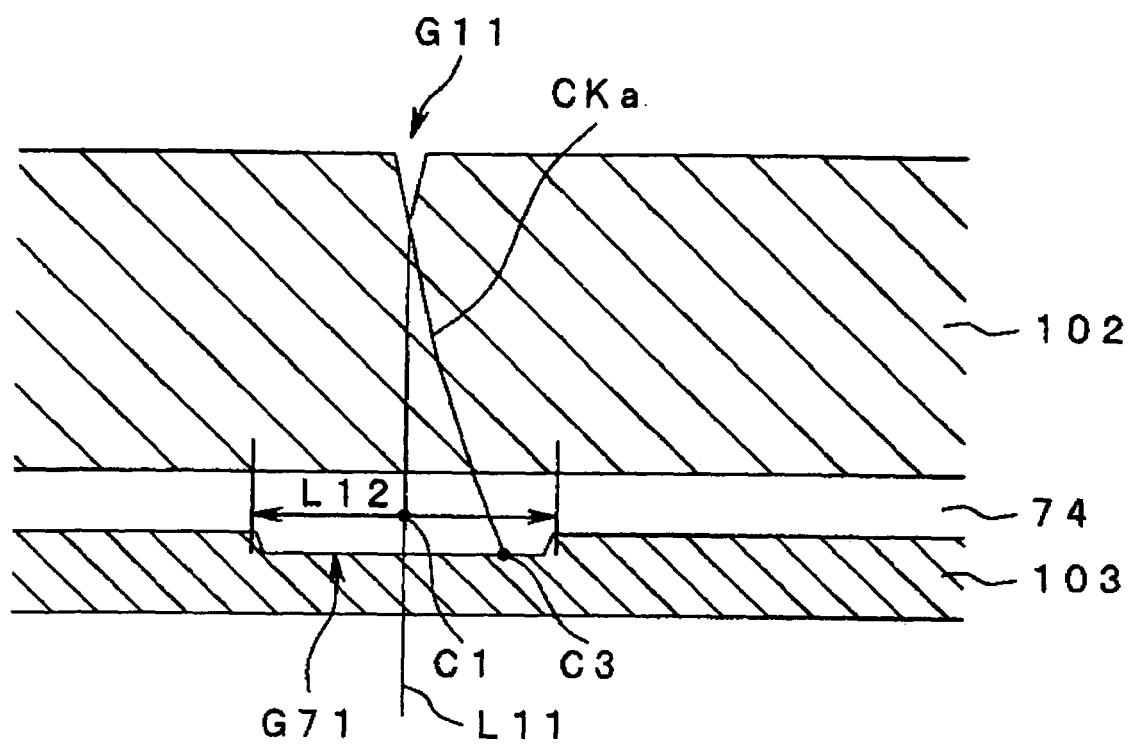
FIG. 13 is a schematic illustrating another example of a groove.

According to the above-described exemplary embodiment, the plurality of grooves are formed along the division line in a predetermined width. However, a wide groove illustrated in FIG. 13 may be formed. FIG. 13 is a schematic illustrating another example of a groove. FIG. 13 illustrates the relationship between the groove G11 of the lens wafer 102 and a wide groove G71 of the cover glass wafer 103 when the wide groove G71 is used instead of the plurality of grooves G12 in FIG. 8 that illustrates the relationship between the groove G11 of the counter substrate wafer 105 and the plurality of grooves G12 of the cover glass wafer 103. The width L21 of the wide groove G71 is determined in accordance with parameters, such as the thickness and material of the lens wafer 102 and the depth of the groove G1. Like in FIG. 8, for example, in accordance with the result of the experiment, when the cracks reach the surface opposite to the groove G11 of the lens wafer 102, the width of changes in the positions of the cracks in the opposite surface is the predetermined width L12. The width L12 in which the cracks exist is equal to the width of the wide groove G71. Thus, in all or almost all cases, when the groove G71 exist in the direction where the cracks proceed, in the groove G71, cracks are generated in the cover glass wafer 103 to completely divide the cover glass wafer 103.

A division method illustrated in FIG. 13 will now be described. When the two substrates that are adhered to each other are divided, first, a groove G11 (such as G3, G4, or G5) is formed on the external surface of one substrate, here, the lens wafer 102 between two substrates that are adhered to each other, here, the lens wafer 102 and the cover glass wafer 103, along a division line L11.

Next, the surface opposite to the adhered surface of another substrate, here the cover glass wafer—103, is pressed along the groove G11 using the break bar to apply bending stress to the two substrates. Due to the bending stress, stress is concentrated on the deepest portion of the groove G11 to generate the crack CKa. As illustrated in FIG. 13, the crack CKa proceeds from the deepest portion of the groove G11 to the inside of the one substrate.

As illustrated in FIG. 13, the crack CKs does not straightly proceed along the division line L11 in most cases. Thus, the crack CKa deviates from the groove G11 formed along the division line L11 and reaches the surface of the layer of the adhesive 74, which faces the cover glass wafer 103. Thus, the position C3 (which is a point in FIG. 13, however, is a line in a plane parallel to the surface of the lens wafer 102, on which grooves are formed) on the surface of the layer of the adhesive 74, which faces the cover glass wafer 103, in which the crack is generated, cannot be described to be on the division line L11.

Thus, in FIG. 13, the cover glass wafer pressed along the groove G11 using the break bar such that bending stress is applied to the two substrates to generate the crack CKa, the predetermined width L12 is determined such that the position C3 in which the crack is generated on the surface of the layer of the adhesive 74, which faces the cover glass wafer 103 is in the predetermined width L12.

The above-described predetermined width L12 is determined in accordance with the parameters such as the thickness and material of the lens wafer 102 and the depth of the groove G11, however, is as follows in the result of the experiment.

Figure 16:
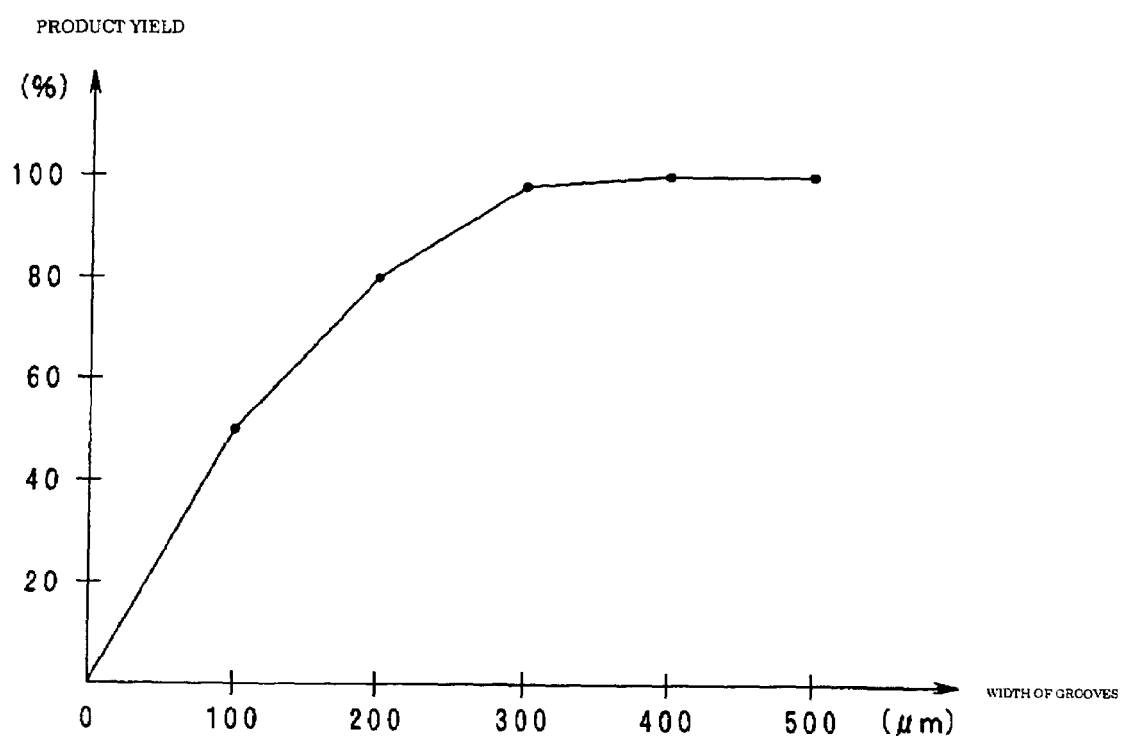
FIG. 16 is a schematic illustrating the relationship between the width of a groove and the product yield.

FIG. 16 is a schematic illustrating the relationship between the width of the groove G71 and the product yield based on the result of the experiment. According to the experiment, the groove G71 is provided such that the division line falls on the center of the groove G71. At this time, the thickness of the lens wafer 102 is 1.2 mm. As illustrated in FIG. 16, the product yield is 50% when a groove having a width of 100 μm is provided, 80% when a groove having a width of 200 μm is provided, 98% when a groove having a width of 300 μm is provided, 100% when a groove having a width of 400 μm is provided, and 100% when a groove having a width of 500 μm is provided.

FIG. 17 is a schematic illustrating the relationship between the thickness of the lens wafer 102 that becomes the counter substrate 20 and the width of the groove G71 when the product yield is 100% based on the result of an experiment. According to this experiment, the groove G71 is provided such that the division line falls on the center of the groove G71. As illustrated in FIG. 17, in the case where the thickness of the lens wafer 102 is 0.6 mm, when the width L12 amounts to 33% of the thickness (0.2 mm), the product yield is 100%. In the case where the thickness of the lens wafer 102 is 1.2 mm, when the width L12 amounts to 25% of the thickness (0.3 mm), the product yield is 100%. In the case where the thickness of the lens wafer 102 is 1.8 mm, when the width L12 amounts to 22% of the thickness (0.4 mm), the product yield is 100%. In the case where the thickness of the lens wafer 102 is 2.4 mm, when the width. L12 amounts to 21% of the thickness (0.5 mm), the product yield is 100%.

Thus, the groove G71 is provided on the surface of the cover glass wafer 103, which faces the lens wafer 102, along the division line L11 in the width where the product yield is approximately 100% with respect to the thickness of the lens wafer 102 that becomes the counter substrate 20. For example, in FIG. 14, the groove G71 is provided in the width L12 that amounts to approximately 20% to 33% of the thickness of the lens wafer 102 to make the product yield 100%.

However, even if the product yield is not 100%, as illustrated in FIG. 16, when the groove G71 having a width of 100 μm is provided in the case where the width L12 is at least 8.3% (approximately 8%) of the thickness of the counter substrate 20, specifically, where the thickness of the lens wafer 102 is 1.2 mm, the product yield is no less than 50%. When the groove G71 having a width of no less than 200 μm is provided in the case where the width L12 is at least 16.7% (approximately 17%) of the thickness of the lens wafer 102, that is, where the thickness of the lens wafer 102 is 1.2 mm, the product yield is no less than 80%. Furthermore, when the groove G71 having a width of 300 μm is provided in the case where the width L12 is at least 25% of the thickness of the lens wafer 102, that is, where the thickness of the lens wafer 102 is 1.2 mm, the product yield is no less than 98%. Furthermore, when the groove G71 having a width of 400 μm is provided in the case where the width L12 is at least 33% of the thickness of the lens wafer 102, that is, where the thickness of the lens wafer 102 is 1.2 mm, the product yield is 100%.

Thus, it is possible to determine the width of the grove G71 such that the product yield is no less than a desired value. That is, since a crack is generated in the cover glass wafer 103 in the groove G71, such that the cover glass wafer 103 is completely divided, it is possible to reduce or prevent division inferiority from being generated in the desired product yield. For example, in the case where the thickness of the lens wafer 102 is 1.2 mm, when it is desired that the product yield is about 50%, the width of the groove G71 is determined as 100 μm. When it is desired that the product yield is about 80%, the width of the groove G71 is determined as 200 μm. When it is desired that the product yield is about 98%, the width of the groove G71 is determined as 300 μm. When it is desired that the product yield is 100%, the width of the groove G71 is determined to be no less than 400 μm.

According to the above-described exemplary embodiment, the large TFT wafer, the large lens wafer, and the large cover glass wafer are circular like a semiconductor wafer as illustrated in FIGS. 3 and 4. However, according to an exemplary aspect of the present invention, the shape of the large TFT wafer, the large lens wafer, and the large cover glass wafer is not limited to be circular and may be a polygon such as a quadrangle.

Furthermore, the width in which the plurality of grooves are provided or the width in which the one wide groove is provided is the width in which undesired divisions do not occur, that is, in which regions not to be divided are not included.

According to the above-described present exemplary embodiment, the large TFT wafer, the large lens wafer, and the large cover glass wafer is circular like a semiconductor wafer as illustrated in FIGS. 3 and 4. However, according to an exemplary aspect of the present invention, the shape of the large TFT wafer, the large lens wafer, and the large cover glass wafer is not limited to be circular and may be a polygon such as a quadrangle.

Thus, according to the above-described present exemplary embodiment, it is possible to realize a method of manufacturing a liquid crystal display device capable of completely dividing the plurality of substrates used for the liquid crystal display device along division lines. The order in which the respective steps are performed in the manufacturing method according to the present exemplary invention may be changed, such that a plurality of steps are simultaneously performed or that the order in which the steps are performed may vary as long as the changes do not go against the properties of the steps.

While this invention has been particularly described with reference to exemplary embodiments thereof, it will be understood by those skilled in the art that various changes in form and details may be made without departing from the spirit and scope of the invention.

What is claimed is:

1. A method of manufacturing an electro-optical device by dividing three or more substrates, which are adhered to each other, along a division line, the method comprising:
   first adhering of adhering a first substrate to a second substrate on a surface of the second substrate, a plurality of grooves or a groove being formed along the division line in a predetermined width on the surface of the second substrate;
   second adhering of adhering the first substrate and the second substrate adhered in the first adhering step and a third substrate to each other on another surface of the second substrate, which is opposite to the surface of the second substrate where the plurality of grooves or the one groove is formed; and
   dividing the first to third substrates by generating cracks in the respective surfaces of the first substrate and the third substrate opposite to surfaces which face the second substrate, along the division line.

2. The method of manufacturing an electro-optical device according to claim 1, when the first substrate is divided by generating the cracks along the division line, the predetermined width is defined by the positions of cracks that reach a surface of the first substrate facing the second substrate.

3. The method of manufacturing an electro-optical device according to claim 1,
   the first substrate being a lens substrate, on which a micro lens array is formed,
   the second substrate being cover glass polished to a predetermined thickness after the first adhering to form a light-shielding layer; and
   the third substrate being a TFT substrate which has pixel electrodes and thin film transistors corresponding to the pixel electrodes; and
   before the second adhering electro-optical material being enclosed between the second substrate and the third substrate.

4. The method of manufacturing an electro-optical device according to claim 3, in the dividing, after dividing the third substrate by generating cracks in the third substrate, the first substrate being divided by generating cracks in the first substrate.

5. A method of manufacturing an electro-optical device by dividing at least a plurality of substrates adhered to each other along a division line, the method comprising:
   preparing a first substrate and a second substrate each having a plurality of grooves or a groove formed along the division line in a predetermined width;
   first adhering of adhering the first substrate and the second substrate to each other by adhering another surface of the first substrate opposite to a surface of the first substrate where the plurality of grooves or the one groove is formed, and a surface of the second substrate on which the plurality of grooves or the one groove is formed;
   second adhering of adhering the first substrate and the third substrate to each other on the surface of the first substrate on which the plurality of grooves or the one groove is formed;

third adhering of adhering the second substrate and a fourth substrate to each other on the surface of the second substrate opposite to the surface of the second substrate on which the plurality of grooves or the one groove is formed; and dividing the first to fourth substrates by generating cracks in surfaces of the third substrate and the fourth substrate opposite to surfaces which face the first substrate and the second substrate, respectively, along the division line.

6. The method of manufacturing an electro-optical device according to claim 5, when the cracks are generated along the division line to divide the third substrate, the predetermined width being defined by the positions of cracks that reach a surface of the third surface facing the first substrate.

7. The method of manufacturing an electro-optical device according to claim 5, the first substrate being a lens substrate, on which a micro lens array is formed, the second substrate being glass polished to a predetermined thickness after the first adhering to form a light-shielding layer, the third substrate being a dustproof substrate, and the fourth substrate being a TFT substrate which has pixel electrodes and thin film transistors corresponding to the pixel electrodes; and before the third adhering electro-optical material being enclosed between the second substrate and the fourth substrate.

8. A method of manufacturing an electro-optical device by dividing at least a plurality of substrates adhered to each other along a division line, the method comprising:

preparing a first substrate and a second substrate each having a plurality of grooves or a groove formed along the division line in a predetermined width;

first adhering of adhering the first substrate and a third substrate to each other on a surface of the first substrate where the plurality of grooves or the one groove is formed;

second adhering of adhering the second substrate and a fourth substrate to each other on a surface of the second substrate where the plurality of grooves or the one groove is formed;

third adhering of adhering the first substrate and the second substrate to each other by adhering another surface of the first substrate, which is opposite to the surface of the first substrate where the plurality of grooves or the one groove is formed, and the surface of the second substrate which is opposite to the surface of the second substrate where the plurality of grooves or the one groove is formed; and dividing the first to fourth substrates by generating cracks in surfaces of the third substrate and the fourth substrate opposite to surfaces which face the first substrate and the second substrate, respectively, along the division line.

9. The method of manufacturing an electro-optical device according to claim 8, when the third substrate and the fourth substrate are divided by generating cracks along the division line, the predetermined width being defined by the positions of cracks that reach a surface of the third substrate facing the first substrate and the positions of cracks that reach a surface the fourth substrate facing the second substrate.

10. The method of manufacturing an electro-optical device according to claim 8, the first substrate being cover glass polished to a predetermined thickness after the first adhering to form a light-shielding layer, the second substrate is a TFT substrate which has pixel electrodes and thin film transistors corresponding to the pixel electrodes, the third substrate being a lens substrate, on which a micro lens array is formed, and the fourth substrate being a dustproof substrate; and before the third adhering electro-optical material being enclosed between the first substrate and the second substrate.

11. A method of manufacturing an electro-optical device by dividing at least a plurality of substrates adhered to each other along a division line, the method comprising:

preparing a first substrate, a second substrate, and a third substrate each having a plurality of grooves or a groove formed along the division line in a predetermined width;

first adhering of adhering the first substrate and the second substrate to each other by adhering a surface of the first substrate where the plurality of grooves or the one groove is formed and a surface of the second substrate which is opposite to the surface of the second substrate where the plurality of grooves or the one groove is formed;

second adhering of adhering the second substrate and a fourth substrate to each other on the surface of the second substrate where the plurality of grooves or the one groove is formed;

third adhering of adhering the third substrate and a fifth substrate on a surface of the third substrate where the plurality of grooves or the one groove is formed;

fourth adhering of adhering the first substrate and the third substrate by adhering a surface of the first substrate which is opposite to the surface of the first substrate where the plurality of grooves or the one groove is formed and a surface of the third substrate which is opposite to the surface of the third substrate where the plurality of grooves or the one groove is formed; and dividing the first to fifth substrates by generating cracks in surfaces of the fourth substrate and the fifth substrate opposite to surfaces of the fourth substrate and the fifth substrate which face the second substrate and the third substrate, respectively, along the division line.

12. The method of manufacturing an electro-optical device according to claim 11, when the fourth substrate and the fifth substrate are divided by generating cracks along the division line, the predetermined width being defined by the positions of cracks that reach a surface of the fourth substrate facing the second substrate and a surface of the fifth substrate facing the third substrate.

13. The method of manufacturing an electro-optical device according to claim 11, the first substrate being cover glass polished to a predetermined thickness after the first adhering to form a light-shielding layer, the second substrate being a lens substrate, on which a micro lens array is formed, the third substrate being a TFT substrate which has pixel electrodes and thin film transistors corresponding to the pixel electrodes; and the fourth and fifth substrates being dustproof substrates; and before the fourth adhering electro-optical material being enclosed between the first substrate and the third substrate.

* * * * *